United States Patent [19]

Clarey et al.

[11] Patent Number: 4,975,829

[45] Date of Patent: Dec. 4, 1990

[54] COMMUNICATION INTERFACE PROTOCOL

[75] Inventors: Thomas J. Clarey, Elburn; Jeffrey L. Havens, Aurora, both of Ill.

[73] Assignee: AT&T Bell Laboratories, Murray Hill, N.J.

[21] Appl. No.: 909,687

[22] Filed: Sep. 22, 1986

[51] Int. Cl.$^5$ .............................................. G06F 1/00
[52] U.S. Cl. ................................. 364/200; 364/284.2; 364/240.8; 364/274; 364/280; 364/282.2; 364/280.9; 364/284; 364/284.3
[58] Field of Search ... 364/200 MS File, 900 MS File, 364/300

[56] References Cited

U.S. PATENT DOCUMENTS

| | | | |
|---|---|---|---|
| 4,315,310 | 2/1982 | Bayliss et al. | 364/200 |
| 4,410,962 | 10/1983 | Daniels et al. | 1/900 |
| 4,449,182 | 5/1984 | Rubinson et al. | 364/200 |
| 4,475,156 | 10/1984 | Federico et al. | 364/200 |
| 4,542,457 | 9/1985 | Mortensen et al. | 364/200 |
| 4,587,628 | 5/1986 | Archer et al. | 364/900 |
| 4,589,063 | 5/1986 | Shah et al. | 364/200 |
| 4,649,479 | 3/1987 | Advani et al. | 364/300 |
| 4,701,848 | 10/1987 | Clyde | 364/900 |
| 4,736,321 | 4/1988 | Brown et al. | 364/300 |
| 4,747,040 | 5/1988 | Blanset et al. | 364/200 |
| 4,748,656 | 5/1988 | Gibbs et al. | 364/900 |
| 4,754,395 | 6/1988 | Weisshaar et al. | 364/200 |
| 4,768,150 | 8/1988 | Chang et al. | 364/300 |

OTHER PUBLICATIONS

Weiss, J., "Device Driver Interface for Decentral Device Drivers", Eurographics 79: proceedings, Bologna, Italy, 25-27, Oct. 79.
R. Snively, "Intelligent Host Adapter Directs I/O Traffic, Freeing the Host Processor", *Electronic Design*, vol. 32, No. 19 (09-20-84), pp. 243-246, 248, 250, 252.
J. B. Lohmeyer, "SCSI Host Adapter and Controller Command Structure", *Mini-Micro Conf. Record*, Northeast, N.Y., 5-84, paper 20/3, pp. 1-9.
*Small Computer System Interface (SCLI)*, American National Standard draft proposal X3T9.2/82-2-Rev.17 B (Dec. 16, 1985), pp. 1-197.
*NCR 5385 SCSI Protocol Controller Data Sheet*, NCR Microelectronics Division (1983), pp. 1-50.
Viewgraphs, allegedly presented by NCR at *Proceedings of SCSS 1 Forum*, Merrimack, N.H., Sep. 1985, 11 sheets.
R. Barrett, "SCSI Bus Solves Peripheral Interface Problems," reprint from *Mini-Micro Systems* (May 1984), 4 pages.

*Primary Examiner*—Gareth D. Shaw
*Assistant Examiner*—Rebecca L. Rudolph
*Attorney, Agent, or Firm*—David Volejnicek

[57] ABSTRACT

In a computer system (FIG. 1), targets (13) comprising peripheral devices (18) and target controllers (17) are connected to the host system by means of a device bus (12), illustratively the standard Small Computer System Interface (SCSI) bus. The device bus is connected to the host computer's central control (9) by means of a host adapter (10) and bus (11). The host adapter is controlled from the central control by a host adapter driver (23), while the targets are controlled by target drivers (22). Host adapter driver 23 provides to target drivers a standardized interface (24) for communicating with the targets through the host adapter driver, which interface is optimized to support a simple yet flexible target driver design, and which makes target drivers independent of differences in structure and operation of host computers and hence portable between computers having the same device buses.

46 Claims, No Drawings

COMMUNICATION INTERFACE PROTOCOL

TECHNICAL FIELD

This invention relates to computer systems, and particularly to control structures of a computer system, such as input and output (I/0) control structures, and the manner in which communications are carried out between such control structures in such systems.

BACKGROUND OF THE INVENTION

A communication bus is typically used to connect peripheral devices, such as discs, tapes, printers, and others, to computers. To enable use of a variety of peripheral devices—often made by different manufacturers—with any one of a variety of computers—typically made by other manufacturers—certain buses for connecting the peripheral devices to computers have been standardized. An example of such a standardized bus is the Small Computer System Interface (SCSI) bus.

To enable a computer to communicate with its peripheral devices, the computer typically includes control mechanisms called peripheral device drivers or target drivers. A device driver controls a particular class of devices, such as discs or tapes. It receives requests for input and output operations from requestors—illustratively user processes executing on the computer, —generates the necessary commands for devices to perform desired operations, sends the commands over the communication bus to the devices, receives responses to the commands from the devices over the bus, and returns the responses to the requestors.

A device driver operates within the environment of, and consequently must interface with, other control mechanisms of the particular computer that it is located on. An example of such a control mechanism is a host adapter driver that controls a hardware unit that interfaces the SCSI bus to an I/0 bus or system bus of the computer. Such control mechanisms typically differ from computer to computer, as does the manner in which they interact with the device drivers. Consequently, whereas a peripheral device can be ported, i.e., used by a number of different computers, without modification if those computers use the same standard bus, the device driver for that device generally cannot be so ported, but must be redesigned or modified for each new operating environment. Whereas a standardized bus such as the SCSI bus solves the problem of lack of portability of peripheral devices, it does not solve the problem of lack of portability of the device drivers for those devices. Furthermore, the design of a device driver may be rendered very complex by virtue of the interactions demanded of the device driver by the environment that it must cooperate with. A problem in the art, therefore, is the lack of portability of peripheral device drivers between different computers, and the failure by many computers to support a simple driver design.

SUMMARY OF THE INVENTION

The invention is directed to solving this and other problems and disadvantages of the prior art. According to the invention, there is defined a standard communication interface protocol to peripheral device drivers, for use on a variety of computers. The protocol is used by device drivers and control mechanism of various computers to communicate with each other in the performance of peripheral device jobs. A peripheral device driver may then be ported substantially without modification between any computers that provide the standard interface protocol. This protocol is used within a method of, and apparatus for, performing peripheral device jobs to facilitate this portability. Furthermore, the interface protocol is optimized to support a simple driver design.

The communication interface protocol is for use between a device driver—referred to as a target driver in the illustrative embodiment—and an interface arrangement—comprising a host adapter and host adapter driver in the illustrative embodiment—in a system, such as a computer, for performing device jobs. The system comprises a peripheral device, the device driver for controlling the peripheral device, and the interface arrangement for coupling the devices to the device driver. The interface protocol includes a data structure shared in use by the driver and the interface arrangement. It further includes a plurality of function calls. A first predetermined function call is made by the device driver to the interface arrangement for allocating the data structure to the driver. A second predetermined function call is made by the device driver to the interface arrangement for execution, cooperatively with the device, of a peripheral device job defined by information stored in the data structure by the driver. A third function call is made by the interface arrangement to the device driver, and is a call to whatever function is specified by information that was stored in the data structure by the driver. This function is called upon completion of execution of the job. And a fourth predetermined function call is made by the device driver to the interface arrangement for deallocating the data structure from the driver.

Since the function calls by a device driver to an interface arrangement are standardized, a device driver makes identical function calls to any interface arrangement in order to obtain identical services, irrespective of how the interface arrangement is structured and the manner in which the interface arrangement provides those services. While the provisioning of services such as data structure allocation and deallocation and job execution may be host computer-dependent, the calls for these services under the new protocol are host computer-independent. Also, data that must be exchanged between the device driver and the interface arrangement are exchanged via the data structure in a predetermined, standardized, manner. Advantageously, the function calls are high-level (i.e., abstracted) calls defined to meet the requirements of a variety of device driver designs, and to do so in an uncomplicated manner, thereby allowing use of the communication interface protocol with various device drivers, giving freedom of driver design to driver designers, and supporting simple driver design. Furthermore, since the function call made by the interface arrangement to the device driver is specified by the device driver, flexibility of driver design is further enhanced thereby, as the device driver need not be tailored to work within the constraints of predefined function calls of the interface arrangement. By freeing the device driver of such interface-imposed constraints, driver design is considerably simplified.

Because device driver design is substantially freed of host computer dependencies by use of the protocol, conceivably, a peripheral device manufacturer may provide with a peripheral device a single device driver for use on any of a plurality of computers that use the protocol. The computer vendor or user is then freed of the need to develop his or her own device driver for every peripheral device that he or she wishes to use with a particular one of the plurality of computers.

Illustratively, the communication interface protocol further includes a fifth predetermined function call made by the device driver to the interface arrangement for storing in the data structure information for translating addressing information defining the job and stored in the data structure by the driver. This call facilitates use of the protocol in virtual addressing systems, and frees the device driver of having to concern itself with the addressing conventions of the system in which it operates.

Further, illustratively, the second function call, described above, comprises a call for enqueueing, i.e., placing in a queue, the job defined by the data structure with other unexecuted jobs, for execution in an order in which the jobs are enqueued. Also, the communication interface protocol further includes a fifth predetermined function call for execution of an unenqueued job defined by information stored by the driver in a data structure—either the above-mentioned data structure or a second data structure—the execution to take place before execution of any further enqueued jobs.

This capability of the communication interface protocol allows use of the protocol in systems that employ a queued-access protocol for communicating with peripheral devices, while still permitting almost immediate access to a device when required, for example, for diagnostic and maintenance purposes.

According to the invention as claimed, a device driver for controlling a peripheral device through an interface arrangement comprises the following functional elements making use of the protocol to perform a peripheral device job cooperatively with the interface arrangement. Means for issuing a call to the interface arrangement for allocation of a data structure for a peripheral device job. Means responsive to allocation of a data structure for storing in the data structure first information defining the peripheral device job and second information specifying a call to be made upon completion of execution of the job. Means for issuing a second call to the interface arrangement for execution, in cooperation with the peripheral device, of the job defined by the first information. And means, responsive to receipt from the interface arrangement of the call specified by the second information, for issuing a call to the interface arrangement for deallocation from the driver of the data structure.

In an illustrative embodiment, the first information includes addressing information, and the driver further includes means for issuing a fourth call, prior to the second call, to the interface arrangement for storing in the data structure information for translating the addressing information.

Also in the illustrative embodiment, the driver includes means responsive to receipt from the interface arrangement of the call specified by the second information for examining third information concerning execution of the job and stored in the data structure by the interface arrangement, in order to determine whether job execution was successful or unsuccessful. Exemplarily, the driver also includes means cooperative with the examining means for providing notice of one of successful and unsuccessful job completion. The driver can thus obtain, and report to a requestor of the job, the status of the job.

Further in the illustrative embodiment, the second call is a call for enqueuing the job defined by the first information with other unexecuted jobs for execution in an order in which the jobs are enqueued, and the driver further comprises means, responsive to determination by the determining means that job execution was unsuccessful, for issuing a fourth call to the interfacing arrangement, either for (a) re-execution of the failed job or for (b) execution of a second, unenqueued, job defined by information stored in a second data structure, before execution of any enqueued jobs not presently under execution. This gives the driver the capability to re-execute failed jobs, or to execute maintenance and diagnostic jobs, by bypassing a device queued-access protocol.

Further according to the invention as claimed, a device driver correspondingly performs a peripheral device job by executing the steps that are the functionality of the above-described elements.

Conversely, an arrangement for interfacing a device driver to a device controlled by the driver to perform a peripheral device job comprises the following elements. Means, responsive to receipt of a first call from the device driver, for allocating a data structure to the driver. Means, responsive to receipt of a second call from the device driver, for executing, cooperatively with the device, a peripheral device job defined by information stored in the data structure by the device driver. Means for issuing to the device driver a call specified by information stored in the data structure by the device driver, upon completion of the job. And, means responsive to receipt of a third call from the device driver for deallocating the data structure from the driver.

In an illustrative embodiment, the interfacing arrangement further includes means responsive to receipt of a fourth call from the device driver, for storing in the data structure information for translating addressing information stored in the data structure by the driver.

Also in the illustrative embodiment, the interfacing arrangement comprises means for storing in the data structure information concerning execution of the job, in order to provide the driver with feedback regarding the success of execution of the requested job.

Further, in the illustrative embodiment, the job executing means responsive to the second call comprise means for enqueuing the peripheral device job defined by information stored in the data structure with other unexecuted jobs, and means for executing, cooperatively with the device, enqueued jobs in an order in which they are enqueued. The interface arrangement then further comprises means, responsive to a fourth call from the device driver, for executing an unenqueued job defined by information stored by the device driver in a data structure before executing any enqueued jobs. The call can be for re-execution of the job, defined by information in the above-mentioned data structure, or for execution of another job, defined by information in a second data structure.

The interfacing arrangement according to the invention correspondingly performs a peripheral device job by executing the steps that are the functionality of the above-described elements.

A system according to the invention—illustratively a computer system—includes a peripheral device, a device driver as described above for controlling the device, and an interface arrangement as described above for interfacing the driver to the device. A method of performing a peripheral device job in such a system comprises the steps performed by the device driver in combination with the steps performed by the interface arrangement, both as described above.

The above-described and other advantages and features of the present invention will become apparent from the following description of an illustrative embodiment of the invention taken together with the drawing.

BRIEF DESCRIPTION OF THE DRAWING

FIG. 5 is a flow diagram, of the operation of a target driver of FIG. 1 in response to an interrupt from a "request sense" job;

FIG. 6 is a flow diagram of the operation of the host adapter driver of FIG. 1 in response to a call to allocate a data structure;

FIG. 7 is a flow diagram of the operation of the host adapter driver of FIG. 1 in response to a call to provide address translation information;

FIG. 8 is a flow diagram of the operation of the host adapter driver of FIG. 1 in response to a call to send out a job for execution;

FIG. 9 is a flow diagram of the operation of the host adapter driver of FIG. 1 to send out an immediate command or a function;

FIG. 10 is a flow diagram of the operation of the host adapter driver of FIG. 1 to deallocate a data structure;

FIG. 11 is a block diagram of a data structure for a job and for an immediate command;

FIG. 12 is a block diagram of a data structure for a function;

DETAILED DESCRIPTION

Figure 1:
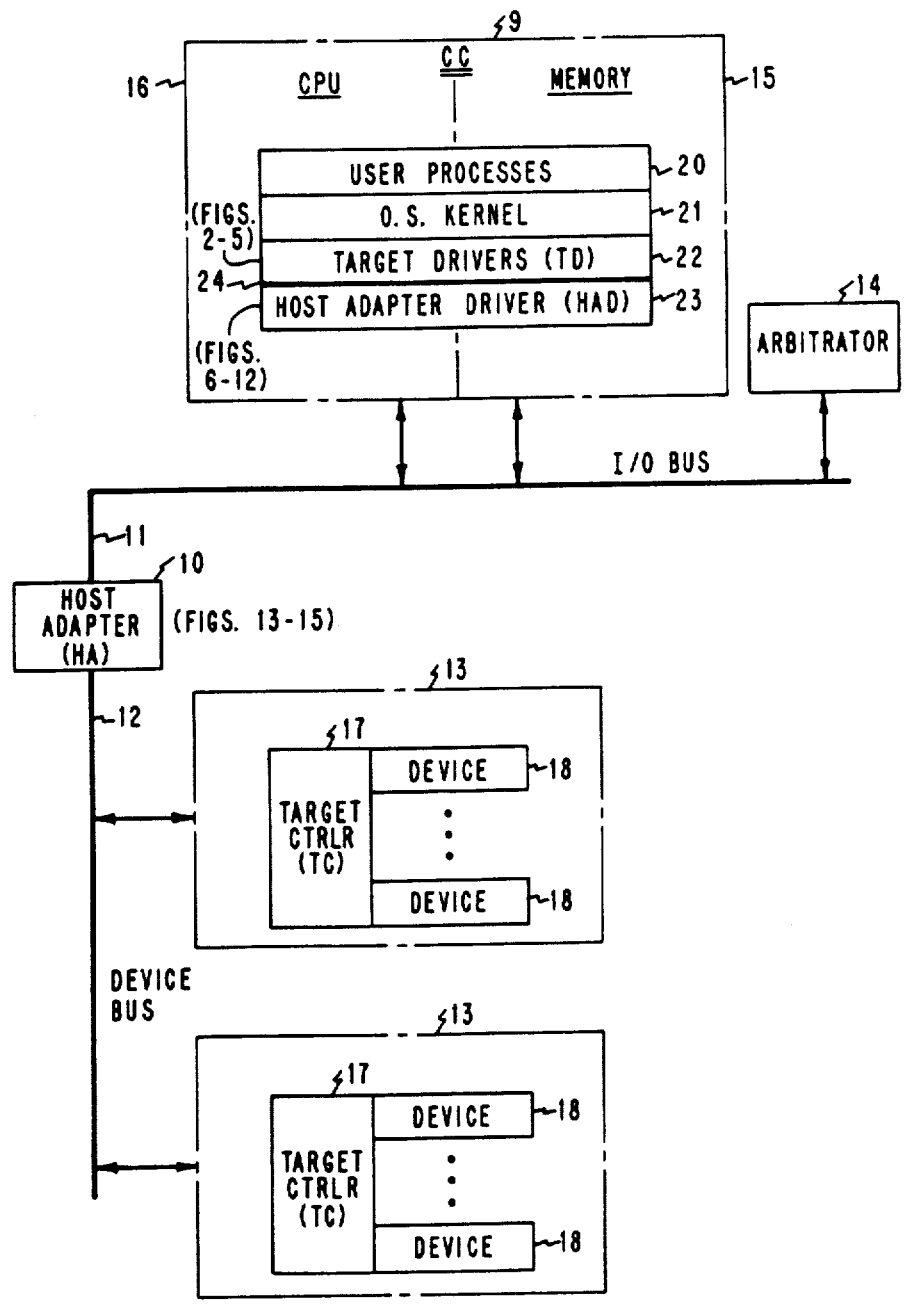
FIG. 1 is a block diagram of a computer system that includes an illustrative embodiment of the invention.

FIG. 16 shows a rudimentary block diagram of an illustrative computer system, for example, a 3B microcomputer of AT&T-Information Systems Inc. The computer system includes a central processing unit (CPU) 16 connected to a memory 15 and forming together therewith a central control (CC) 9. Communicatively coupled to CPU 16 and memory 15 is an input and output (I/0) bus 11 over which peripheral devices 18 communicate with CPU 16 and memory 15.

Devices 18 are conventional, and include, for example, printers, disc drives, and tapes. Devices 18 are configured into targets 13. A target 13 comprises one or more devices of the same type—for example, a plurality of discs—and a target controller 17 for controlling the devices 18.

A plurality of targets 13 are connected for communication to a device bus 12. Target controllers 17 interface devices 18 to device bus 12 in the manner required by the protocol of bus 12. In this illustrative example, bus 12 is the SCSI bus, mentioned above, and described in American National Standard draft proposal X3T9.2/82-2-Rev. 17B of Dec. 16, 1985.

Bus 12 and targets 13 connected thereto are interfaced to bus 11 by a host adapter 10. Host adapter 10 converts communications flowing between buses 11 and 12 from the protocol of the one bus to the protocol of the other bus, and performs other activities such as buffering of communications flowing between the two buses. Devices like host adapter 10 are well known in the art. Illustratively, host adapter 10 is based on the 5385 SCSI Protocol Controller of NCR Corporation. A plurality of host adapters may be coupled to bus 11, each connected to a different device bus 12 and interfacing one or more targets 13 to bus 11. Alternatively, a plurality of host adapters may be coupled to bus 12, each connected to a different computer system's I/0 bus 11.

For purposes of limiting access to bus 11 at any one time to only one host adapter 10 or CPU 16, the computer system of FIG. 1 includes an arbitrator 14. Arbitrator 14 is likewise a conventional device.

Central control 9 includes a plurality of software components 20 through 23. These include user processes 20 which define the application of the computer system of FIG. 1. A process is a fundamental entity of control within the computer system of FIG. 1. Each process illustratively comprises a private data space in memory 15, register values in CPU 16, and a code set stored in memory 15 and possibly shared with other processes. A process may also access common data space in memory 15. Processes 20 execute on CPU 16.

User processes 20 perform various functions, including communicating with targets 13, by calling on primitives of an operating system kernel 21. An operating system is a master control program which has primary control of the allocation of all system resources. The kernel is the memory 15-resident portion of the operating system and comprises one or more routines, i.e., programs. In the illustrative example of FIG. 1, the operating system is the UNIX ® operating system of AT&T.

Kernel 21 does not communicate with targets 13 directly, but calls upon target drivers 22 to do so. Target drivers 22 are control programs each one of which controls a different class of devices and communicates with the devices that it controls in the manner appropriate for those devices, i.e., in a device-specific manner. It is the task of target drivers 22 to convert the request received from kernel 21 into a job executable by a target controller 17, to perform high-level error recovery functions with respect to the job, and to provide results of the job to kernel 21. Target drivers 22 communicate with devices 18 through target controllers 17, in a manner dictated by the standard communication protocol of device bus 12.

Interposed between target drivers 22 and targets 13 are I/0 bus 11 and host adapter 10, both of which may differ from computer system to computer system. In order to make target drivers 22 independent of the structure of I/0 bus 11 and host adapter 10, target drivers 22 communicate with targets 13 indirectly, through host adapter driver 23 and host adapter 10. Host adapter driver 23 is a program that provides a standard communication interface 24 to target drivers 22 and thereby hides from target drivers 22 any differences in structure and protocol that may exist between I/0 bus 11 and host adapter 10 of different processors. Interface 24 is also optimized to support a simple, uncomplicated, target driver 22 design, yet to do so for different target driver designs that control many different types of devices 13. In this illustrative embodiment, interface 24 is referred to as SCSI Driver Interface (SDI). Interface 24 is a communication protocol that comprises a set of functions which are provided by host adapter driver 23 for target drivers 22, data structures which are shared between drivers 22 and 23, and interrupt functions which are provided by target drivers 22 for host adapter driver 23.

Host adapter driver 23 is a program comprising a set of routines that allow target drivers 22 to communicate with target controllers 17. Host adapter driver 23 handles the protocol of communicating between CC 9 and host adapter 10 across bus 11. It is responsible for queueing device commands on host adapter 10, but is independent of target controllers 17 and devices 18 on bus 12. Functionally, host adapter driver 23 appears to be a single unit; however, the actual implementation may be split across several units—across CC 9 and host adapter 10, for example.

Together, host adapter driver 23 and host adapter 10, along with I/0 bus 11 and device bus 12, interface target drivers 22 to targets 13.

When a target driver 22 receives an I/0 request from kernel 21, it issues the required interface 24 commands to host adapter driver 23. Interface 24 isolates host-machine dependencies from target driver 22. In response, host adapter driver 23 performs the host-specific (i.e., machine-dependent) activities, including issuing the I/0 commands via a queued-access protocol in this example. Host adapter 10 passes the issued commands on to target controllers 17 over device bus 12. Target controllers 17 execute the commands on devices 18.

When a job is complete, target controller 17 returns command completion status over device bus 12. Host adapter 10 recovers from errors as needed, and passes the completion status back to host adapter driver 23. Host adapter driver 23 receives the completion status, and passes a completion notice back to target driver 22 via interface 24. Target driver 22 receives the completion notice, does any necessary housekeeping, and then passes the job completion status to kernel 21 so that it may be reported to user process 20 that originated the job.

To communicate information to each other, host adapter driver 23 and target drivers 22 use data structures of interface 24. A data structure is an arrangement of a group of data items, or storage locations therefor, organized for access purposes in a predetermined manner and having a predetermined data size (16 or 32 bits, for example). The data structures are resident in memory 15. In this illustrative embodiment, a data structure is referred to as a SCSI block (SB). There are three types of SBs in this example: a SCSI control block (SCB), an immediate SCSI control block (ISCB), and a SCSI function block (SFB). SCB and ISCB are shown in FIG. 11 and are designated by numeral 1100. SFB is shown in FIG. 12 and is designated by numeral 1200.

Considering FIG. 11, the SCB is the primary data structure used by target drivers 22 and host adapter driver 23. The SCB includes a plurality of fields 1101-1114 that have a data size of 32 bits and contain all information needed for host adapter driver 23 and a target controller 22 to execute an I/0 job. In addition, the SCB includes an area 1115 used for communicating between host adapter driver 23 and host adapter 10. The SCB is used for "normal" control blocks that pass through device job queues within the queued-access protocol.

The ISCB data structure is substantially identical to the SCB structure, but is used for "immediate" control blocks—those that do not pass through job queues within the queued-access protocol but are handled immediately.

The SB TYPE field 1101 indicates the type of block—SCB or ISCB in FIG. 11.

SC_COMP_CODE field 1102 is a completion code that indicates the current status of the job. Once the job is finished—whether successfully or unsuccessfully—this code indicates either that no errors were detected, or the cause of any errors that were detected. In this illustrative embodiment, field 1102 may take on the following values:

SDI_NOALLOC: indicates that this block has not been allocated by the host adapter driver. The target drivers should never detect this code; the SC_COMP_CODE is set to this value when the SB is freed.

SDI_ASW: all seems well means that the job has completed normally and no errors were detected.

SDI_LINKFO: indicates that this linked command completed normally and a device bus (SCSI) command flag bit was zero.

SDI_LINKFI: indicates that this linked command completed normally and a device bus (SCSI) command flag bit was one.

SDI_QFLUSH: when the target driver requests that the job queue for a device be flushed, all jobs in the queue are returned with this completion code.

SDI_ABORT: indicates that this job was aborted by the target driver.

SDI_RESET: when the host adapter driver detects a reset on the device bus, it returns all outstanding and queued jobs to the target drivers with this condition code. This code is also returned when a target driver requests that a target controller be reset.

SDI_CRESET: the host adapter driver was working on this job and a fatal protocol error was detected, which caused the host adapter driver to reset the device bus.

SDI_V2PERR: indicates that virtual-to-physical address translation failed. For example, this error would be returned if a required page table was not present.

SDI_TIME: is returned when the host adapter driver times out a job.

SDI_NOTEQ: is returned by the host adapter driver when it believes the device is not equipped.

SDI_HAERR: indicates there was some problem between the host adapter driver and the host adapter. Possible causes are lack of I/0 bus parity or an insane host adapter.

SDI_MEMERR: indicates there was a memory fault while accessing the data area of the job.

SDI_SBUSER: is set when the host adapter encounters a problem on the device bus and all recovery action fails. A controller with a faulty bus driver could cause such an error.

SDI_CKSTAT: indicates that the status field should be checked. This error code is returned when the target controller returns a status other than GOOD.

SDI_SCBERR: is returned if the SCB contains an error or an invalid type.

SDI_OOS: is returned when a job is submitted for a device which is out-of-service.

SDI_NOSELE: indicate that the host adapter driver timed-out trying to select a target controller.

SDI_MISMAT: indicates that a target controller attempted to perform an operation which did not agree with the data supplied in the SCB. For example the controller attempted a data-in transfer, and the SCB_READ flag was not set in SC_MODE.

SDI_PROGRES: indicates that the job has not completed yet. The SC_COMP_CODE is set to this value by host adapter driver in the SDI_ICMD and SDI_SEND functions.

SDI_UNUSED: is for use by the target driver when it is not using the control structure. The host adapter driver sets the SC_COMP_CODE to this value when it allocates an SB for a target driver.

SDI_ONEIC: is returned when more than one immediate request has been sent.

SDI_SFBERR: indicates an error in a field of an SFB.

All of the above completion codes have a bit field indicating the type of completion code. Four examples of possible completion codes are:

SDI_ERROR: indicates that there was an error.

SDI_RETRY: indicates that the error was probably unrelated to this job and that the job may be retried.

SDI_MESS: indicates that a message regarding this event has already been printed on a console and logged in an error log.

SDI_SUSPEND: indicates that the host adapter driver has suspended job processing for this device.

Continuing now with a description of the fields of the structure of FIG. 11.

SC_INT field 1103 is a pointer to a target driver interrupt handler. The interrupt handler is a function to be called by the host adapter driver to notify the target driver that the job has completed. It is called with one argument which points to the SB of the job which completed.

If the SC_COMP_CODE field indicates SDI_SUSPEND, then the host adapter has suspended sending commands to the logical unit and the target driver is responsible for resuming the queue. If the SC_INT field is NULL, the host adapter will not execute any target driver function. The interrupt handler will not be called by the host adapter driver if the job completes during the call which sent the command. The only fields which the host adapter changes in the SCB are: SC_COMP_CODE, SC_TIME, and SC_STATUS. When linked commands are used, each command is returned via the SC_INT when that part of the link completes.

SC_STATUS field 1110 is a value returned by the target controller. When a CHECK CONDITION or BUSY status is returned, the host adapter suspends processing of queued commands to the device. If INTERMEDIATE status is returned, the host adapter driver returns this control block to the target driver and links to the next one.

SC_CMDPT field 1104 is a virtual address pointing to the start of a target controller command block, with the size of the block indicated by the SC_CMDSZ field 1112. The command block in SC_CMDPT is not interpreted by the host adapter driver.

SC_DATAPT field 1105 is a virtual address pointing to the start of the data area for the command, with the size of the area indicated by the SC_DATASZ field 1113.

SC_LINK field 1111 is used with linked commands. When the target controller returns INTERMEDIATE status, the host adapter driver uses the link pointer to advance to the next control block. This allows the target driver to define completely different pointers for each command. When linked commands are used, the LINK bit in the SC_MODE field must be set.

SC_RESID field 1114 indicates how many more bytes have been requested from the target controller than is indicated in the data buffer. This is used for partial block transfers. Residue bytes which are received from the target controller are discarded by the host adapter driver. Residue bytes which are requested by the target controller are sent as zeros.

SC_TIME field 1107 indicates the maximum number of milliseconds the host adapter driver should wait for the job to complete. The timing begins when the command is sent to the target controller, and the completion status must be returned before the timer runs out. If a time-out occurs, the host adapter driver sends an ABORT message to the target controller and returns the job to the target driver. The processing of queued jobs for that target controller is suspended until it is resumed by the target driver. If the SC_TIME field is zero, the job is not timed. The returned value of SC_TIME indicates the actual amount of time that the job took.

SC_DEV field 1108 is the address of the device on the device bus. The address comprises a device number which is passed to the target driver by the kernel, and a logical unit number. Host adapter driver decodes the target controller and host adapter address from the device number. The logical unit number identifies a particular device under a target controller.

SC_WD field 1106 is provided for use by the target drivers. The field is not examined or changed by the host adapter driver.

SC_MODE field 1109 indicates any special modes for this job. The valid values for this field in this illustrative example are shown below.

SCB_WRITE indicates a non-read job

SCB_READ indicates a read data job

SCB_LINK indicates that device bus (SCSI) command linking is used.

SCB_HAAD indicates that the address is supplied by the host adapter driver.

SCB_PARTBLK indicates partial block transfer.

When SCB_PARTBLK is set in the mode field, it indicates that the data area does not define the complete transfer. In this case, the SC_RESID field indicates how many more bytes to expect in the transfer. These extra bytes will not be transferred between system memory and the device bus. If the transfer is a write, zeros will be sent to the target controller.

In addition to these fields, structure 1100 contains an area 1115 used to communicate information from the host adapter driver to the host adapter. The target controllers are not aware of this area.

Considering FIG. 12, the SFB is used to make function requests to host adapter driver 23. SFBs are "immediate" function blocks; like ISCBs, they do not pass through job queues but are handled immediately.

The SFB includes a plurality of fields 1201–1205, and an area 1206 used for communications between host adapter driver 23 and host adapter 10. The fields are defined as follows.

SB_TYPE field 1201 indicates the type of the block—SFB in FIG. 12.

SF_COMP_CODE field 1202 is identical to the SC_COMP_CODE field in the SCB, and takes on the same values.

SF_INT and SF_DEV fields 1203 and 1204 are used in the same way as in the SCB structure. The only field which the host adapter changes in the SFB is SC_COMP_CODE.

SF_FUNC field 1205 indicates the function to be performed. In this illustrative example, the defined functions are as follows:

SFB_NOPF: indicates no-op function, used when the target driver wants to only suspend or resume a queue.

SFB_RESTM: requests that the host adapter driver send a bus device reset message to the addressed target controller.

SFB_ABORTM: when this code is passed, an ABORT message is sent to the addressed logical unit.

SFB_FLUSHR: is a request to flush a logical unit's work queue.

SFB_RESUME: indicates resume the normal job queue.

SFB_SUSPEND: indicates suspend the normal job queue. Suspending a queue means that normal jobs will not be sent to the logical unit until the queue has been resumed by the target driver.

In addition to these fields, structure 1200 contains the area 1206 which is akin to area 1115 of FIG. 11.

Figure 13:
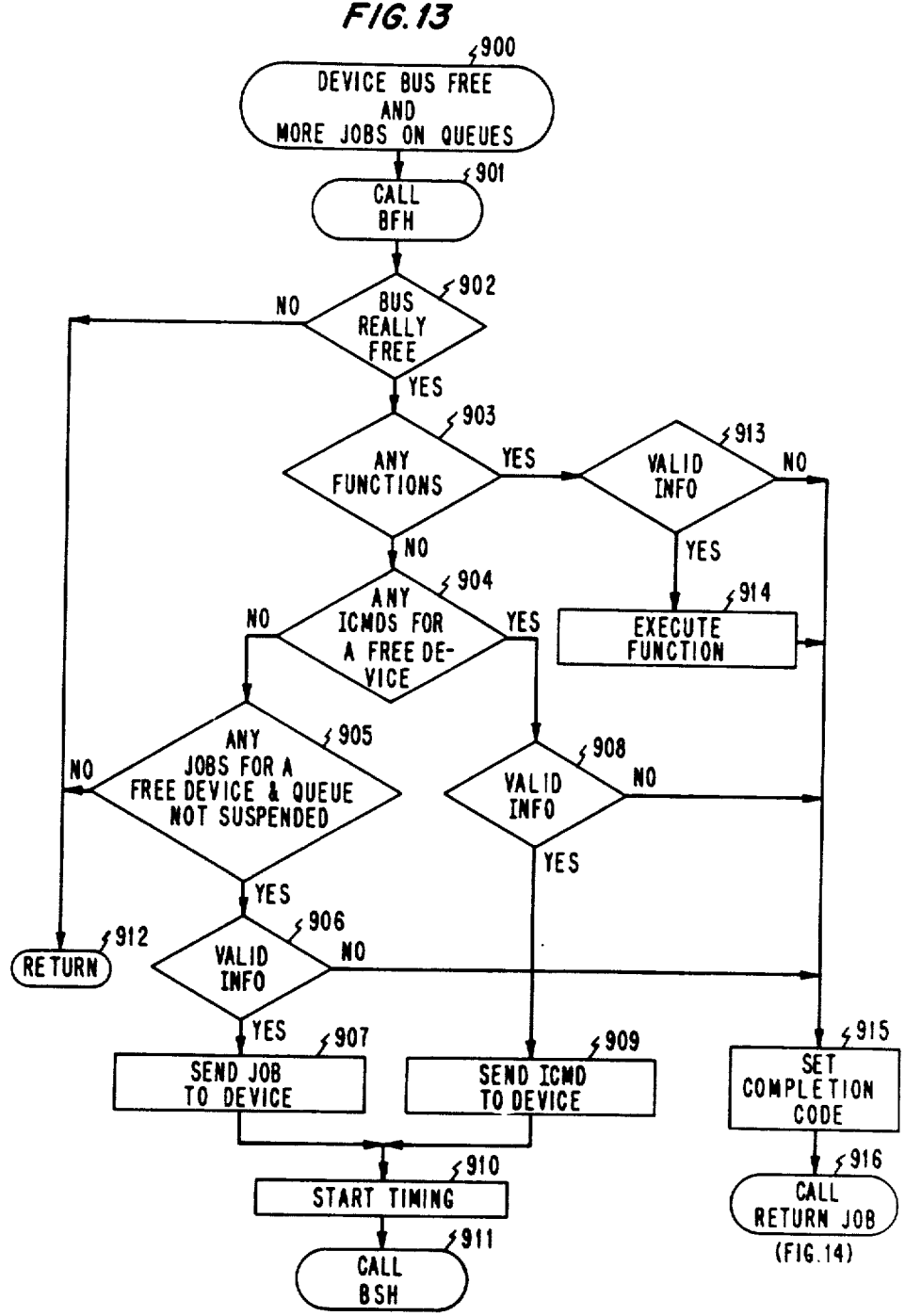
FIG. 13 is a flow diagram of the relevant operation of the host adapter of FIG. 1.
Figure 14:
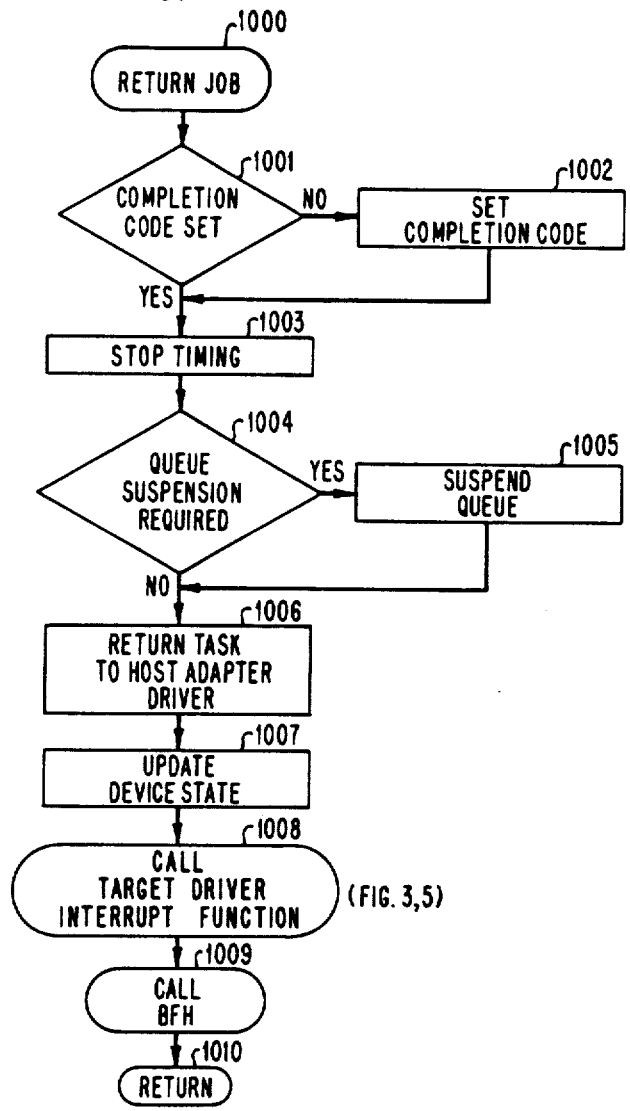
FIG. 14 is a flow diagram of the "return job" function of FIG. 9.
Figure 15:
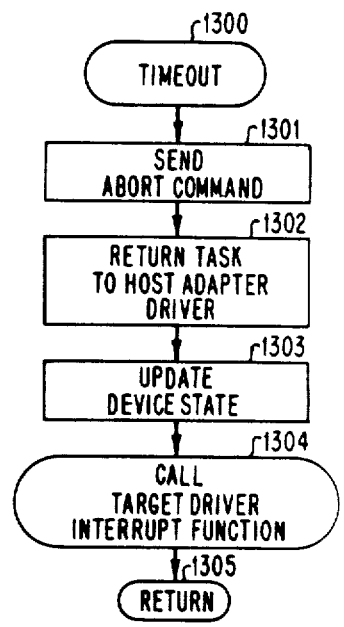
FIG. 15 is a flow diagram of a timeout function of the host adapter of FIG. 1.

In order to illustrate the functionality and use of interface 24, FIGS. 2-5 flowchart the operation of a generalized target driver 22, while FIGS. 6-10 flowchart relevant portions of the operation of host adapter driver 23, and FIGS. 13-15 flowchart relevant portions of the operation of host adapter 10. Details of the structure and operation of a target driver are dependent upon the type and characteristics of devices that the target driver is designed to control. It is an advantage of interface 24 that it is independent of the device-specific features of target drivers, and thus is usable with target drivers for many types of devices. The device-specific aspects of the operation of a target driver are therefore irrelevant to the described embodiment of the invention.

Figure 2:
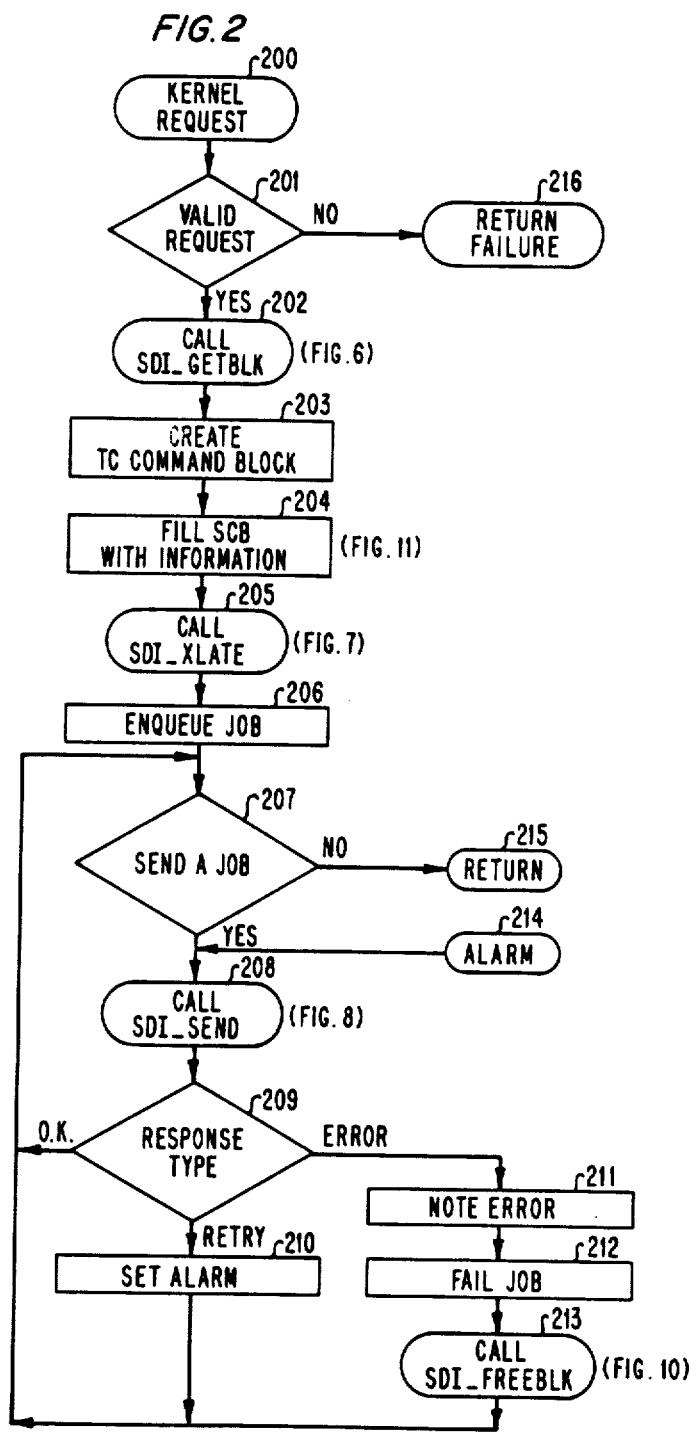
FIG. 2 is a flow diagram of the operation of a target driver of FIG. 1 in response to a kernel request.

Turning to FIG. 2, it illustrates operation of a target driver 22 in response to a kernel 21 request. Target driver 22 receives a call from kernel 21, at step 200, requesting it to perform a peripheral device job such as an I/0 job. An I/0 job may be, for example, a request to read or write a data file on a storage device such as a disk or a tape. As part of such a call, kernel 21 makes available to target driver information required to perform the I/0 task. Such information may include a device number identifying target 13 for which the I/0 job is intended, a virtual address in I/0 address space at which the job is to be performed, an address in memory 15 at which a block of data for transfer to the device is to be obtained or at which a block of data transferred from a device is to be stored, and length of the data block.

In response to the call, target driver 22 examines the information provided as part of the call, in order to validate the request, at step 201. For example, target driver 22 checks whether the address and the size of the block are within allowed range, and whether target 13 for which this request is intended exists. If the check at step 201 indicates that the request is invalid, target driver 22 returns to kernel 21 a failure indication, at step 216. If the request is valid, however, driver 22 calls an SDI_GETBLK function, at step 202. This function call is part of interface 24 provided by host adapter driver 23. The SDI_GETBLK function allocates an SB for the job to target driver 22.

Response of host adapter driver 23 to the SDI_GETBLK call is flowcharted in FIG. 6. Upon receipt of the call, at step 400, host adapter driver 23 checks whether any SB is free and available, at step 401. Illustratively, host adapter driver 23 maintains a list of free SBs, and checks whether the list is empty.

If an SB is not available, host adapter driver 23 waits for one to become freed and available, at step 402. An SB becomes available by execution of an SDI_FREEBLK function, shown in FIG. 10. This function returns a previously-allocated SB to the free list. If a block is available, or when one does become available, host adapter driver 23 allocates an SB to target driver 22, at step 403. Illustratively, host adapter driver 23 does so by updating the state of its linked list to remove the allocated SB therefrom. Host adapter driver 23 then returns the allocated SB to target driver 22, at step 404, illustratively by returning to target driver 22 a pointer to the SB in memory 15.

Alternatively, there may be only one target driver 22 in the system, or every target driver 22 may have a group of SBs dedicated for its own use. In such a case, every SB has only one target driver 22 associated therewith as its user. Allocation of an SB to the target driver is then more precisely an allocation of one of the available SBs for the target driver's task that prompted the allocation call.

Returning to FIG. 2, after it has called the SDI_GETBLK function at step 202, target driver 22 creates in memory 15 a target controller command block, at step 203. This block is the message by which target driver 22 communicates with a target controller 17 and directs it to perform a particular job. The target controller command block is defined by the specification of device bus 12 (illustratively the SCSI specification). Inter alia, this block includes an op code that specifies to target controller 17 the function to be performed, a logical unit number identifying the one of devices 18 controlled by target controller 17 on which the function is to be performed, addressing information identifying the data block on which the function is to be performed, the size of that data block, and control flags.

The SB obtained by target driver 22 at step 202 is empty, and target driver 22 proceeds to fill it, at block 204, with information to form an SCB of FIG. 11. Inter alia, target controller specifies an SCB in SB_TYPE field 1101 of the SB, and enters in SC_CHDPT field 1104 a pointer to the target controller command block that it created at step 203.

Having filled the SCB block, target driver 22 calls an SDI_XLATE function, at step 205, passing a pointer to the SCB as an argument. This function call is part of interface 24. The SDI_XLATE function provides translation information for the virtual address, (SC_DATAPT field 1105) and size (SC_DATASZ field 1103) which are passed by the SCB (see FIG. 11).

Response of host adapter driver 23 to the SDI_XLATE call is flowcharted in FIG. 7. Upon receipt of the call, at step 500, host adapter driver 23 obtains process-dependent information (i.e., information dependent upon the particular process that initiated the I/0 job), which is required for translation, at step 501. Illustratively, host adapter driver 22 obtains such information from a memory management function of kernel 21. Host adaptor driver 23 may not obtain the information directly, but may, for example, obtain a pointer to a segment descriptor table in memory 15 that contains this information. Host adapter driver 23 then stores the obtained information in the SCB, at step 502, in area 1115 (see FIG. 11).

In an alternative embodiment, instead of storing translation information in area 1115 at step 502, host adapter driver 23 may directly perform: the translation on the basis of this information and store the translated results in fields 1105 and 1113. In either case, the translation information comes to be stored in the SCB.

Host adapter driver 23 then returns to target driver 22, at step 503.

Returning to FIG. 2, after calling the SDI_XLATE function at step 205, target driver 22 enqueues on its work queue the I/O job represented by the SCB, at step 206, illustratively by placing a pointer to the SCB on a linked list. Target driver 22 then determines whether to send a job out for execution, at block 207. The basis for decision is target driver-dependent. For example, target driver 22 may wait for any previously-sent job to complete before sending another job. If target driver 22 determines that a job should not be sent out for execution, it returns to kernel 21, at step 215.

If target driver 22 determines at step 207 that a job should be sent out for execution, it calls an SDI_SEND function, at step 208, passing a pointer to the first SCB on its work queue as an argument. The function call is part of interface 24. The SDI_SEND function takes an SB and sends the target controller command block on to the target controller. Commands sent to a logical unit via this function are executed by the logical unit in the order in which they are sent.

Response of host adapter driver 23 to the SDI_SEND call is flowcharted in FIG. 8. Upon receipt of the call, at step 600, host adapter driver 23 examines contents of the SB pointed to by the passed pointer in order to validate the request, at step 601. For example, host adapter driver 23 checks to make sure that SB_TYPE field 1101 (see FIG. 11) is correct for this request. If the check at step 601 indicates that the request is invalid, host adapter driver 23 returns to target driver with an error indication, at step 609.

If the request is valid, host adapter driver 23 checks at step 602 whether the logical unit (device 18) to which the job is directed is operational and capable of performing the job. For example, host adapter driver 23 checks device status information kept by host adapter 10 to make this determination. If the target device 13 does not check out, host adapter driver 23 fails the job, at step 603, by placing the appropriate code in SC_COMP_CODE field 1102 (see FIG. 11) of the SB. The code warns the host adapter 10 not to try to execute the job. Host adapter driver 23 then continues to step 604, to satisfy the SCSI requirement that jobs must be performed and returned in the order in which they are submitted.

Following step 603, or if the target device 13 checks out at step 602, host adapter driver 23 fills fields of area 1115 (see FIG. 11) of the SB with information required by host adapter 10 during its participation in execution of the job, at step 604. This information varies with the particular structure of host adapter 10. It may include, for example, the physical address of the target controller command block, and the virtual address of the SCB.

Host adapter 10 maintains a work queue for every device 18, and host adapter driver 23 checks whether there is room on the queue of target device 18 for the SCB, at step 605. If the queue is full, host adapter driver 23 returns a "retry" message to target driver 22, at step 608. The retry message indicates that host adapter driver 23 cannot accept the job at this time, and it should be retried later. If the queue is not full, host adapter driver 23 has the SCB placed on the queue of target device 18, at step 606. Depending upon implementation, host adapter driver 23 can place the SCB on the queue directly, or it can request host adapter 10 to do so. Host adapter driver 23 then returns to target driver 22 with an "O.K." message, at step 607. The O.K. message indicates that the request has not completed yet, and the target driver interrupt handler function will be called when it does.

Returning to FIG. 2, following the SDI_SEND function call at step 208, target driver 22 examines the message returned by host adapter driver 23. If the response indicates that the function call was successful, target driver 22 returns to step 207 to determine whether there are any jobs queued on its work queue, and if so, whether to send the next job out for execution.

If the response received at step 209 is a "retry," target driver 22 sets an alarm timer, at step 210, which it identifies with the job that failed to be sent. Target driver 22 then returns to step 207. When the alarm timer times out, it alerts target driver 22, at block 214, which responds by calling SDI_SEND at step 208 to try and send that job again.

If the response received at step 209 is an error, target controller 22 notes the error in an error log, at step 211. Preferably, target controller 22 also causes the error to be printed out on a console of the computer of FIG. 1. Target controller 22 then fails the job, at step 212, illustratively by calling a function of kernel 21 that signifies job completion and passing to it as an argument an error identifier that indicates the cause of failure. The job being completed, albeit unsuccessfully, target controller 22 calls the SDI_FREEBLK function, at step 213, passing a pointer to the completed job's SCB as an argument. This function call is part of interface 24. The SDI_FREEBLK function returns a previously allocated SB to the free block pool.

Response of host adapter driver 23 to the SDI_FREEBLK call is flowcharted in FIG. 10. Upon receipt of the call, at step 800, host adapter driver 23 validates the request for deallocation of the SB pointed to by the passed pointer, at step 801. For example, host adapter driver 23 makes sure that the block to be deallocated is an allocated block. If validation fails, host adapter driver 23 causes an error indication to be printed out on a control console of the system of FIG. 1, at step 802, and then "crashes" the system, at step 803. A crash disables the system, and the system must be reinitialized before it can resume operation.

If the request is found to be valid at step 801, host adapter driver 23 deallocates the SB, at step 804. Illustratively, host adapter driver 23 does so by clearing the contents of the SB, and updating the state of its linked list of free blocks to include among them the deallocated SB. Host adapter driver 23 then returns to target controller 22, at step 805.

Assuming that a job was sent out successfully, upon completion of execution of that job, whether successful or unsuccessful, host adapter 10 fills in appropriate values in fields of the job's SCB, and then calls whatever target driver interrupt handler routine was specified by target driver 22 in SC_INT field 1103 of the SCB (see FIG. 11). This function call is part of interface 24.

Figure 3:
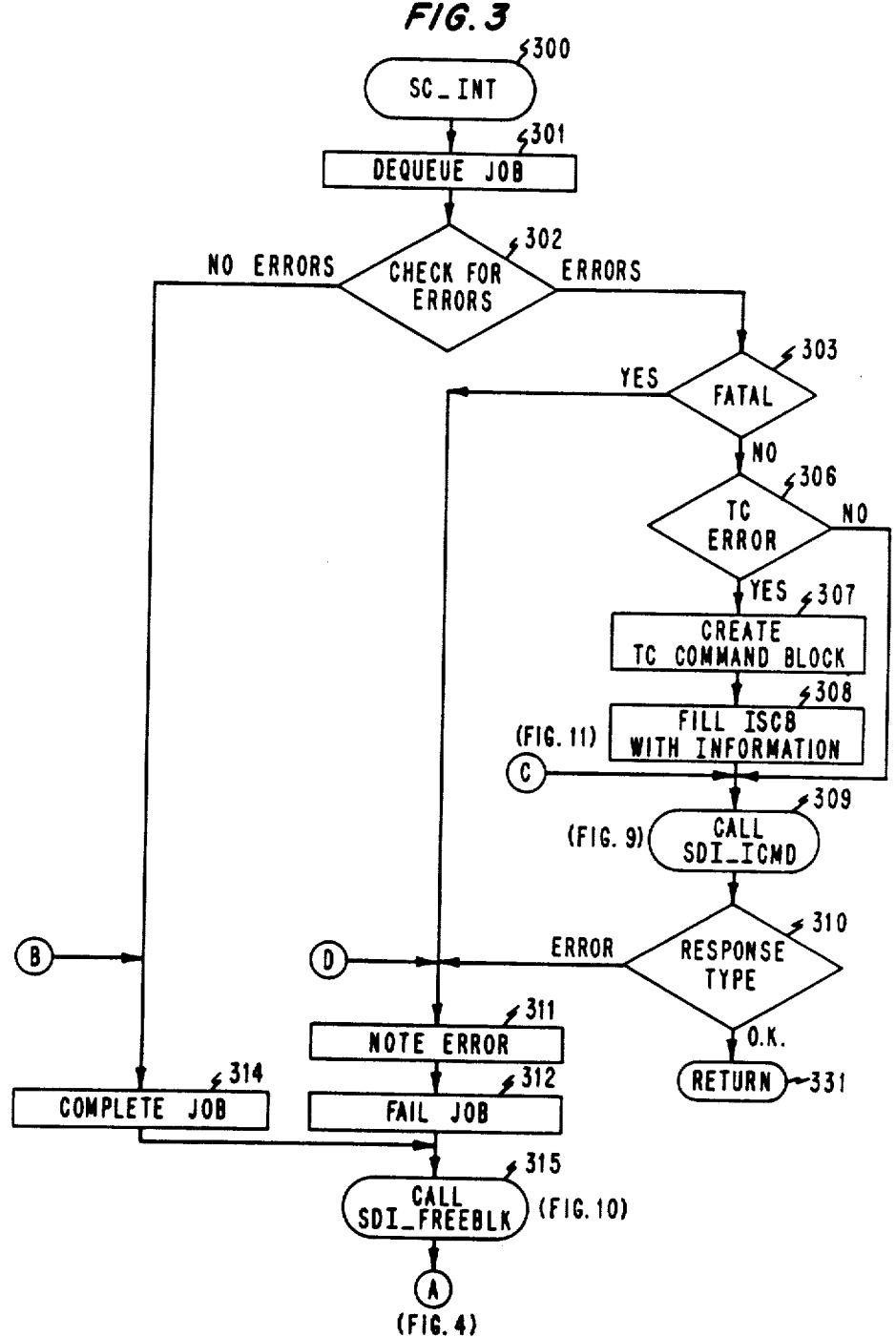
FIGS. 3-4 are a flow diagram of the operation of a target driver of FIG. 1 in response to an interrupt.
Figure 4:
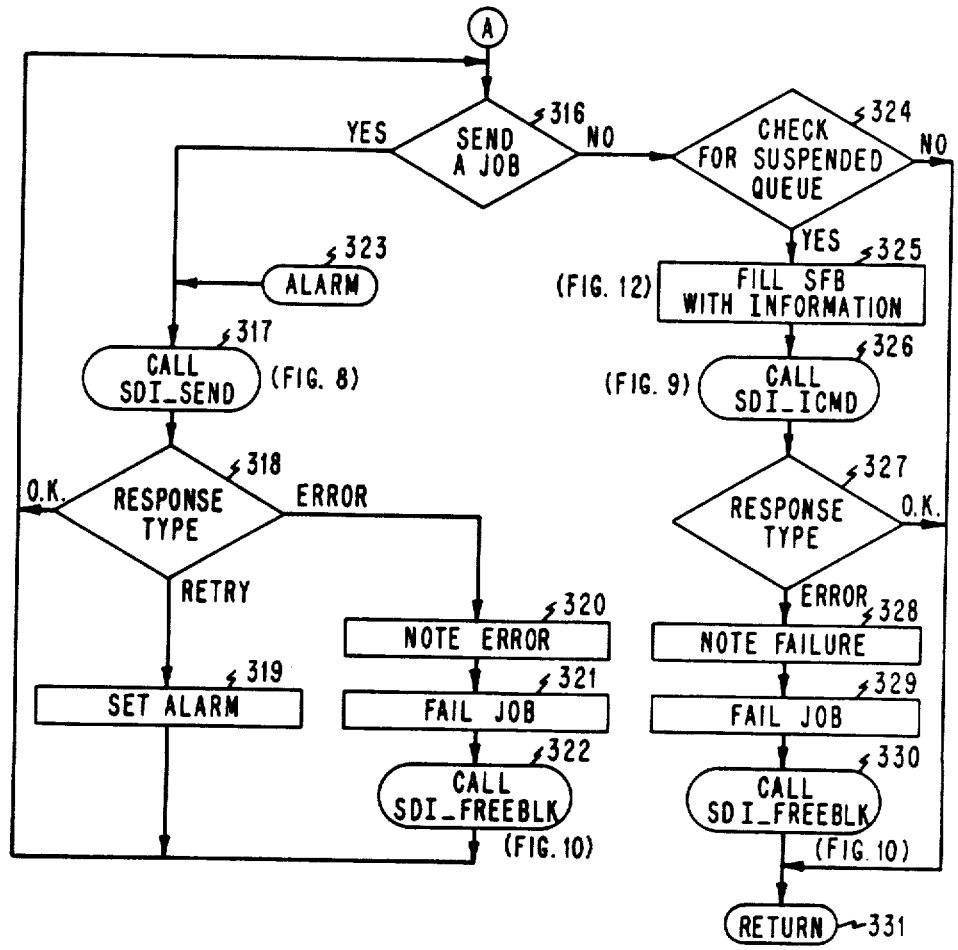

Since it is a target driver 22 that specifies which one of, possibly, a plurality of interrupt handling routines will be called, and since different target drivers 22 may have different interrupt handling routines, response of target drivers 22 to the call will vary. However, certain features of the response are likely to be common to all target drivers' interrupt routines. FIGS. 3–4 diagram the generalized operation of a target driver 22 in response to an interrupt in order to illustrate these common features and use of interface 24 thereby.

Upon receipt of the interrupt, at step 300, target driver 22 dequeues from its work queue the job whose completion has been signaled, at step 301. Illustratively, target driver 22 does so by removing a pointer to the SCB of that job from a linked list of pointers. Target driver 22 then examines contents of the job's SCB for errors, at step 302. This examination includes examining SC_COMP_CODE field 1102 and SC_STATUS field 1110 (see FIG. 11) to determine if any errors are indicated thereby.

If no errors are found at step 302, it means that the job was executed successfully, and target driver 22 completes the job, at step 314. Inter alia, this involves calling an interrupt function of kernel 21 to inform it that the job has completed, and passing to it results of the job and an indication that the completion was successful. Target driver 22 then calls the SDI_FREEBLK function of FIG. 10, at step 315, to deallocate the SCB of the completed job. Target driver 22 then proceeds to step 316 to check for other jobs on its work queue to send to targets 13.

If errors are found at step 302, target controller 22 determines, at step 303, whether they are fatal to the job. Fatality is a function of, for example, the type of job being run, the type of device 18 being controlled by target driver 22, and the error recovery capabilities provided by target controller 22. If the errors are determined to be fatal, target controller 22 notes them in an error log that it maintains and by outputting an error message on a console (not shown) of the system of FIG. 1, at step 311, and also fails the job, at step 312. Failing the job includes calling an interrupt function of kernel 21 to inform it of completion of the job and providing it with information indicating that the competition was unsuccessful. Target driver 22 then proceeds to steps 315 and 316, to call the SDI_FREEBLK function and to check its work queue for other jobs to send, respectively.

If errors found at step 302 are determined not to be fatal, at step 303, target driver 22 examines the error information provided by the job's SCB to determine if target controller 17 failed the job, at step 306. If not, target driver calls an SDI_ICMD function of host adapter driver 23, at step 309. This function call is part of interface 24. SDI_ICMD is functionally analogous to SDI_SEND, discussed earlier, the exception being that the function bypasses the SCBs enqueued in a logical unit's (device 18) queue of the queued access protocol, and immediately executes the requested operation. Only if the logical unit is busy is the job queued, and then only until the unit becomes free.

The purpose of this SDI_ICMD call is to retry the failed I/0 job immediately, without going through the job queue of target device 17. For this purpose, target driver 22 passes a pointer to the SB of the failed job as part of the SDI_ICMD call.

Because it is the SDI_ICMD function and not the SDI_SEND function that is being called, prior to calling SDI_ICMD and passing to it the pointer to the SB of the job, target driver 22 enters the value for ISCB in SB_TYPE field 1101 of the SB, to match the SB type with the call.

If target driver 22 determines at step 306 that it was target controller 17 that failed the I/0 job, target driver 22 creates a "request sense" job, at steps 307–308 This job requests from target controller 17 information on why it failed the job. The request sense job is defined by the device bus 12 (SCSI) specification. Target driver 22 creates the job at steps 307–308 in a manner akin to creating a standard job as described for steps 203 and 204. It creates a target controller command block, at step 307, and proceeds to fill an SB with information, at step 308. Target driver 22 does not call the SDI_GETBLK function to assign to it an SB, but rather makes use of an SB that was preassigned to it, for maintenance and diagnostic purposes, at system initialization. Target driver 22 also does not call the SDI_XLATE function to provide translation information, as translations necessary for maintenance and diagnostics, if any, will have been done at initialization time. Furthermore, target driver 22 enters a value for ISCB in SB_TYPE field 1101 (see FIG. 11) to identify the block as an ISCB. Target driver 22 then calls the SDI_ICMD function, at step 309, passing a pointer to the ISCB created at step 308, to cause execution of the request sense job.

Response of host adapter driver 23 to an SDI_ICMD call is diagramed in FIG. 9. A comparison of FIG. 9 with FIG. 8 will show that steps 701–704 and 709 are identical with steps 601–604 and 609, and the description given above applies to both.

Following completion of entry of information in the SB, at step 704, host adapter driver 23 examines SB_TYPE field 1101 or 1201 (see FIGS. 11 and 12) of the SB to determine if it is an ISCB or an SFB, at step 705. If the SB is an ISCB, host adapter driver 23 places it on an "immediate" queue for target device 18. Host adapter 10 maintains an immediate queue for each device 18. The immediate queue is a queue of length one; only one job can be on the queue at a tire. A job on the immediate queue takes priority over any jobs on the normal job queue of a device 18. The net effect of placing a job on an immediate queue is to place the job at the head of the normal job queue, or to bypass the normal job queue. Host adapter driver 23 then returns to target driver 22 with an "O.K." message, at step 708.

If the SB is found to be an SFB at step 705, host adapter driver 23 places the job on a function queue maintained by host adapter 10, at step 707. A host adapter 10 has only one function queue. Jobs on the function queue take priority over jobs on all other queues. Host adapter driver 23 then returns to target driver 22 with an "O.K." message, at step 708.

Returning to FIG. 3, after calling the SDI_ICMD function, at step 309, to retry the original I/0 job or to execute the "request sense" job, target driver 22 examines the response returned by that function If the response is "O.K.," indicating that the request has not completed yet but the target driver interrupt handler will be called when it does complete, target driver 22 merely returns, at step 331, to the point at which it was interrupted at step 300.

If the response is "error," indicating that the request failed validation, target driver 22 proceeds to step 311 to note the original error—the error in the original I/0 job that led to an attempt to re-execute the job or to execute the request sense job—in the error log and by outputting an error message on a console, then proceeds to step 312 to fail the original I/0 job, and finally proceeds to step 315 to deallocate the SCB of the original I/0 job, all in the manner discussed previously. Target driver 22 then continues operation at step 316 of FIG. 4.

A comparison of FIG. 4 with FIG. 2 will show that steps 316-323 are substantially identical with steps 207-214, and the description given above applies to both. A difference is that, at step 316, target driver 22 checks only whether to send a job to the particular device 18 for which it has just completed or failed a job, as opposed to just any device 18.

Upon the occurrence of certain errors, target driver 22 may need to undertake certain actions, such as determining the cause of those errors, before the affected device 18 undertakes any new jobs. For this reason, upon receiving notice from target controller 17 of one or more of such errors, host adapter 10 "suspends" the work queue that it maintains for that device 18 to prevent any jobs on the work queue from being sent to device 18. Illustratively, host adapter 10 suspends a device's work queue by setting a flag associated with the queue, and notifies target driver 22 thereof by means of SC_COMP_CODE field 1102 of the SB of the error-affected I/0 job.

When target driver 22 determines at step 316 that there is no job on the work queue to send out to device 18, or that whatever jobs are on its work queue should not be sent out to device 18 at this time, it proceeds to check whether the queue for that device 18 is suspended, at step 324. Illustratively, target driver 22 does so by examining SC_COMP_CODE field 1102 of the SB whose pointer it received as step 300. If the queue is not suspended, target driver 22 returns, at step 331, to the point at which it was interrupted at step 300.

If it finds the queue suspended, target driver 22 creates an SFB (see FIG. 12), at step 325, by filling with information the preassigned SB described above in conjunction with the request sense job. The function of the job represented by the SFB is to "resume" the queue, i.e., to enable sending of jobs from the queue to associated device 18. Since this is a job for host adapter 10 and not for a target controller 17, no pointer to a target controller command block is included in the SFB. Target driver 22 then calls the SDI_ICMD function, at step 326, passing a pointer to the SFB created at step 325.

Response of host adapter driver 23 to the call is as described above for FIG. 9.

After calling the SDI_ICMD function at step 326, target driver 22 examines the response returned by that function, at step 327. If the response is "O.K.", indicating that the request has not completed yet but the specified target driver interrupt handler will be called when it does complete, target driver 22 merely returns, at step 331, to the point at which it was interrupted at step 300.

If the response is "error", indicating that the request failed validation, target driver 22 notes the failure on an error log, and by outputting an error message on a console, at step 328. Target driver 22 also fails the original I/0 job, at step 329, in a manner analogous to that described for step 312. Target driver 22 then calls the SDI_FREEBLK function of FIG. 10 to free the SB of the failed job, at step 330, and finally, target driver 22 returns, at step 331, to the point at which it was interrupted at step 300.

FIG. 5 flowcharts the response of target controller 22 to completion of a successfully-sent "request sense" job (see steps 307-309 of FIG. 3).

Upon receipt of a call to the target driver interrupt handler specified in SC_INT field 1103 of the request sense job's ISCB, at step 1400, target driver 22 examines contents of the job's ISCB for errors, at step 1401, in a manner akin to that described for step 302. If no errors are found, target driver 22 continues operation at step 314 of FIG. 3 to successfully complete the original I/0 job. If errors are found, target driver 22 determines, at step 1402, whether they are fatal to the original I/0 job. Target driver 22 makes that determination in a manner akin to that described for step 303. If the errors are fatal, target driver 22 proceeds to steps 311 et seq. of FIG. 3 to fail the original I/0 job. If the errors are not fatal, target driver 22 proceeds to step 309 of FIG. 3 to try re-executing the original I/0 job.

FIGS. 13-15 flowchart portions of the operation of host adapter 10 that are relevant to an understanding of interface 24. Turning first to FIG. 13, when device bus 12 becomes free and there are jobs waiting to execute on device work queues, at step 900, host adapter 10 calls a bus-free handler (BFH) function, at step 901. This function is responsible for sending an initialization command to a target controller 17 and otherwise prepares target controller 17 and bus 12 for performing another job. The BFH function is defined by the SCSI bus specification.

Having called the BFH function, host adapter 10 examines results thereof to determine whether bus 12 is really free, at step 902. For example, a unit having higher priority of access to bus 12 than this host adapter 10 may be requesting access to bus 12, so consequently bus 12 may not be free for use by this host adapter 10. If bus 12 is not really free, host adapter 10 merely returns, at step 912, to await the bus becoming free.

If bus 12 is free, host adapter 10 checks its function queue, on which SFBs are queued, to determine if there are any functions to perform at step 903. If there are no functions, host adapter 10 checks device 18 immediate queues, on which ISCBs are queued, of free devices 18 to determine if there are any immediate commands to perform, at step 904. And, if there are no immediate commands, host adapter 10 checks device job queues, on which SCBs are queued, of free devices 18 for which queues are not suspended, to determine if there are any I/0 jobs to perform, at step 905. If there are no jobs, host adapter 10 returns, at step 912, to await receipt of work to do.

If host adapter 10 finds a job pending on an unsuspended queue, of a free device 18, at step 905, it examines the SCB to validate information contained by it, at step 906. If validation fails, host adapter 10 sets completion code of the SCB to indicate the failure, at step 915, and then calls, at step 916, a "return job" function of FIG. 14, discussed below. If validation succeeds, host adapter 10 sends the job to device 18 over bus 12 through target controller 17, at step 907, and starts a timer to time the duration of the job, at step 910. Response of host adapter 10 to the timer timing out is flowcharted in FIG. 15. Host adapter 10 then calls a bus state handler (BSH) function, at step 911. This function handles communications with target controller 17 that are required for completion of the job. The BSH function is defined by the SCSI bus specification. When the job completes, the BSH function calls the "return job" function of FIG. 14.

If host adapter 10 finds an immediate command pending on an immediate queue of a free device, at step 904, it examines the ISCB to validate information contained by it, at step 908. If validation fails, host adapter 10 sets the completion code of the ISCB to indicate the failure, at step 915, and then calls the "return job" function of FIG. 14, at step 916. If validation succeeds, host adapter 10 sends the immediate command to device 18 over bus 12 through target controller 17, at step 909, and then starts timing the job, at step 910, and calls the BSH function, at step 911.

If host adapter 10 finds a function on the function queue, at step 903, it examines the BFH to validate information contained by it, at step 913. If validation succeeds, host adapter 10 executes the function, at step 914, and then calls the "return job" function of FIG. 14, at step 915. If validation fails, host adapter 10 sets the completion code of the BFH to indicate the failure, at step 915, and then calls the "return job" function, at step 916.

The "return job" function flowcharted in FIG. 14 is executed by host adapter 10 upon completion—successful or unsuccessful—of execution of any job, command, or function. Its purpose is to return information about the completion to the originating target driver 22.

When it receives the "return job" call, at step 1000, host adapter 10 checks whether the completion code field (SC_COMP_CODE field 1102 or SF_COMP_CODE field 1202, see FIGS. 11 and 12) of the SB of the job, command, or function, is set. If not, host adapter 10 sets it. If or when the code is set, host adapter 10 stops timing the job or command, at step 1003, and checks the completion code field to determine whether job queue suspension for the device 18 is required, at step 1004. Criteria for job suspension are dependent upon the indicated error type and upon the requirements of the application to which the system is put. If queue suspension is required, host adapter 10 suspends the queue, at step 1005. Following queue suspension, or if queue suspension is not required, host adapter 10 returns the job, command, or function to host adapter driver 23, at step 1006. Illustratively, the return is accomplished via an interrupt of, or a function call to, host adapter driver 23, passing a pointer to the SB of the job, command or function as an agreement. Host adapter 10 then updates the state of any information that it maintains about the device 18 to which the job, command, or function related, at step 1007, to reflect the completion. Host adapter 10 then issues an interrupt to host adapter driver 23 to cause it to call whatever target driver interrupt function was specified by the SC_INT field 1103 or SB_INT field 1203 (see FIGS. 11 and 12) of the SB of the completed job. The call notifies target driver 22 of completion of execution of the task specified by the SB. This call is part of interface 24. It allows the target driver 22 itself to specify how it wishes to be notified of job, command, and function completion. Response of target driver 22 to this call is flowcharted in FIGS. 3-4 and was discussed above.

Following the call of the target driver interrupt function, host adapter 10 calls the BFH function, at step 1009, and then returns, at step 1010, to the point at which it was called at step 1000.

FIG. 15 indicates operation of host adapter 10 in response to a timer, started at step 910 of FIG. 13, timing out before the timer is stopped at step 1003 of FIG. 14.

Upon receipt of the timeout indication, at step 1300, host adapter 10 sends an abort signal to target controller 17 of device 18 to which the job or immediate command pertains, at step 1301, in order to abort the job or command. Host adapter 10 then returns the task to host adapter driver 23, at step 1302, in the manner described for step 1006 of FIG. 14. Host adapter 10 updates the state of device 18 to which the task pertains, at step 1303, in the manner described for step 1007 of FIG. 14. And host adapter 10 generates an interrupt to host adapter driver 23 to cause host adapter driver 23 to call the target driver interrupt function specified by the task's SB, at step 1304, which call notifies target driver 22 of the abort. Finally, at step 1305, host adapter 10 returns to the point at which it was interrupted at step 1300.

Of course, it should be understood that various changes and modifications to the illustrative embodiment described above will be apparent to those skilled in the art. Such changes and modifications can be made without departing from the spirit and the scope of the invention and without diminishing its attendant advantages. It is therefore intended that all such changes and modifications be covered by the following claims.

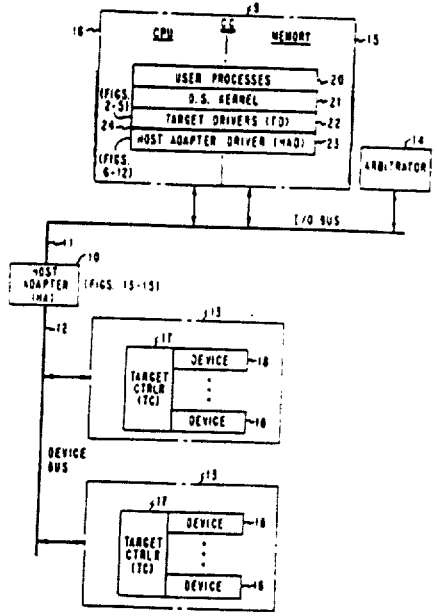

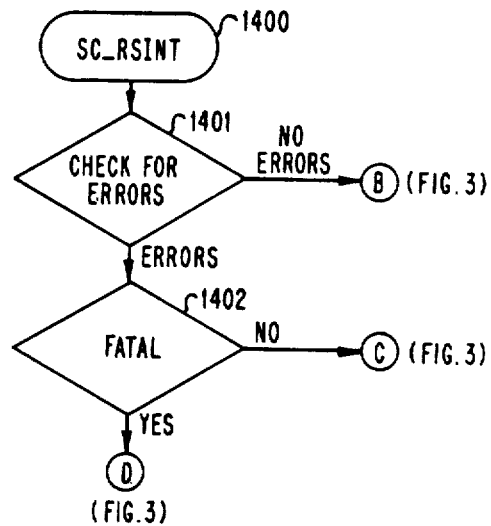
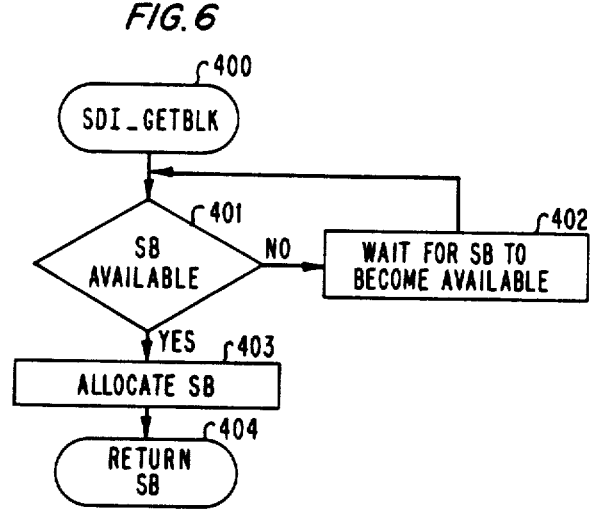
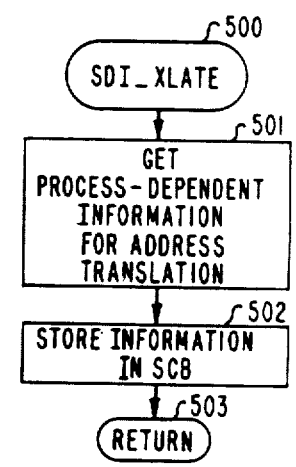

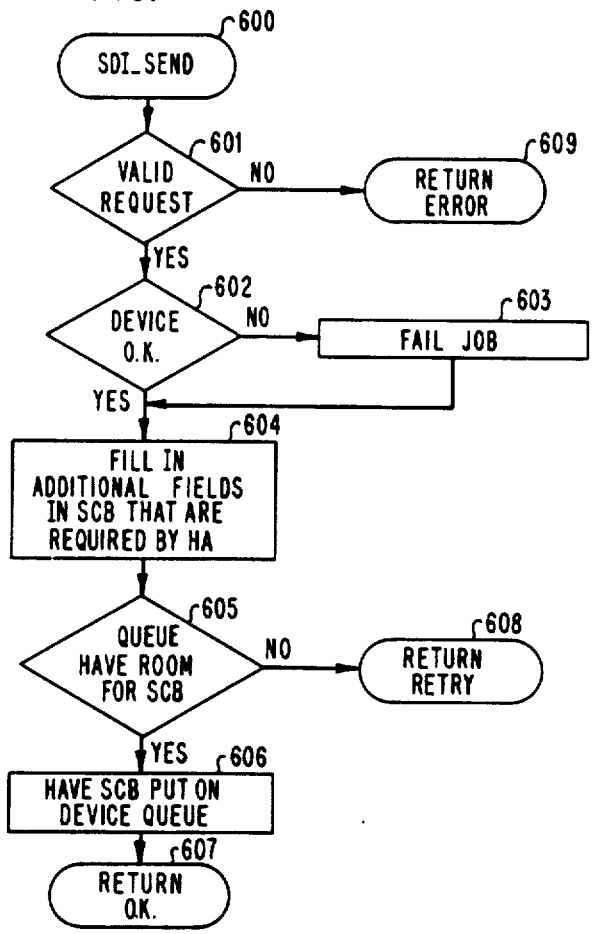

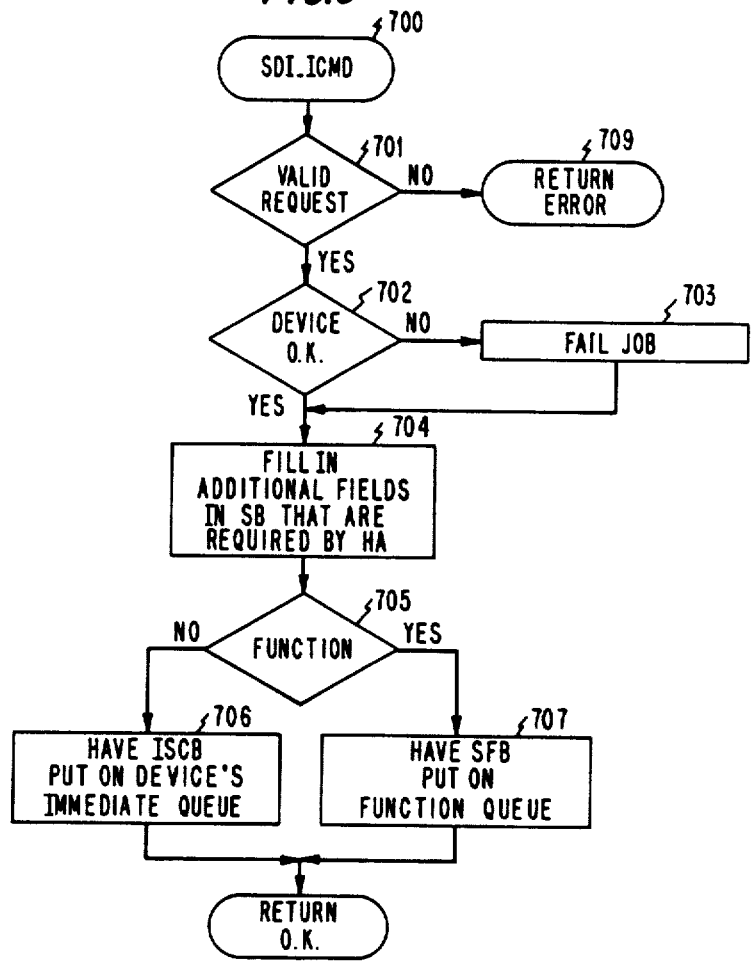
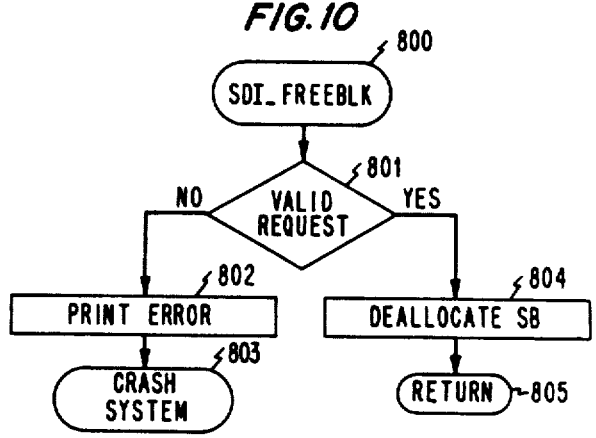

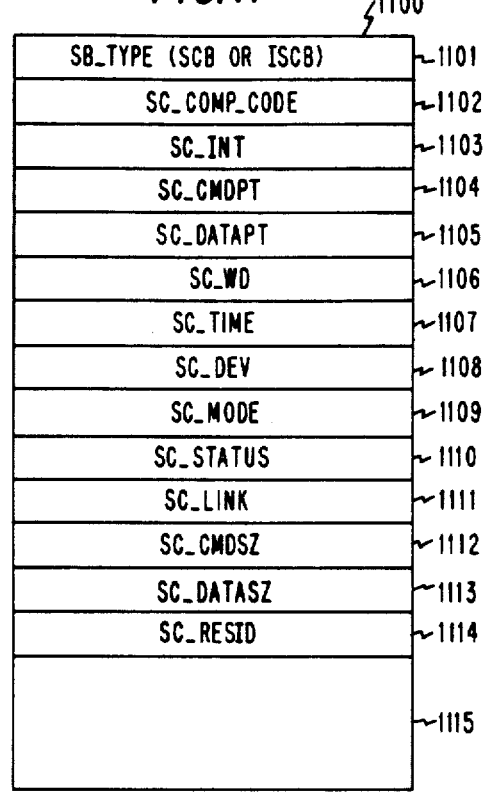
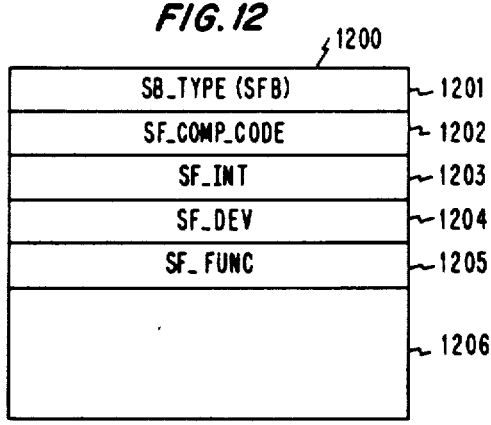

What is claimed is:

1. A method of performing a peripheral device job in a system defining any one of a plurality of different operating environments, the system including any one of a plurality of peripheral devices, a driver for controlling the one peripheral device by issuing control communications to the one peripheral device, and any one of a plurality of different arrangements each for interfacing the driver to any one of the peripheral devices by conveying the control communications between the driver and the one device either through a different operating environment or through the same operating environment in a different manner, comprising the steps of:

the driver issuing identical function calls in any one of a plurality of systems to any one of the plurality of arrangements for any one of the plurality of devices and obtaining in response identical services in any one of the systems from any one of the arrangements irrespective of the manner or the operating environment in which the one arrangement provides the services, thereby making the driver portable between the systems of the plurality of systems, the steps of issuing and obtaining including the steps of the driver issuing a first system-independent, interfacing arrangement-independent, and device-independent call to the interfacing arrangement;

in response to receipt of the first call, the interfacing arrangement allocating a data structure to the driver;

in response to the allocation, the driver storing in the data structure first information defining a peripheral device job and second information specifying a call to be made upon completion of execution of the job, the first and the second information and manner of storage thereof in the data structure being identical irrespective of either which one of the plurality of interfacing arrangements or which one of the plurality of operating environments is the included arrangement or defined environment;

the driver issuing a second system-independent, interfacing arrangement-independent, and device-independent call to the interfacing arrangement;

in response to receipt of the second call, the interfacing arrangement executing, in cooperation with the peripheral device, the job defined by the first information;

upon completion of execution of the job, the interfacing arrangement issuing to the driver the call specified by the second information;

following the receipt of the call from the interfacing arrangement, the driver issuing a third system-independent, interfacing arrangement-independent, and device-independent call to the interfacing arrangement; and in response to receipt of the third call, the interfacing arrangement deallocating the data structure from the driver.

2. The method of claim 1 wherein the step of storing in the data structure first and second information comprises the step of the driver storing in the data structure the first information including addressing information, and the second information; and wherein the step of issuing a second call is preceded by the steps of the driver issuing a fourth call to the interfacing arrangement, and in response to receipt of the fourth call, the interfacing arrangement storing in the data structure information for translating the addressing information.

3. The method of claim 1 wherein the step of executing the job comprises the steps of in response to receipt of the second call, enqueuing the job with other unexecuted jobs, and executing, in cooperation with the peripheral device, enqueued jobs in an order in which they are enqueued; wherein the step of issuing to the driver the specified call is preceded by the step of the interfacing arrangement storing in the data structure third information concerning success of execution of the job; and wherein the step of issuing to the driver the call specified by the second information is followed by the steps of following receipt of the call from the interfacing arrangement, the driver examining the third information to determine whether job execution was successful, in response to determining that job execution was unsuccessful, the driver issuing a fourth call to the interfacing arrangement, and in response to receipt of the fourth call, the interfacing arrangement executing an unenqueued job defined by information stored in a data structure by the driver, before executing any enqueued jobs.

4. The method of claim 3 wherein the step of executing a job in response to receipt of the fourth call comprises the step of re-executing, in cooperation with the peripheral device, the unsuccessfully-executed job defined by the first information, before executing any enqueued jobs.

5. The method of claim 3 wherein the step of issuing a fourth call is preceded by the step of in response to determining that job execution was unsuccessful, the driver storing in a second data structure fourth information defining a second job; and wherein the step of executing a job in response to receipt of the fourth call comprises the step of executing the job defined by the fourth information before executing any enqueued jobs.

6. A method of performing a peripheral device job in a system defining any one of a plurality of different operating environments, the system including any one of a plurality of peripheral devices, a driver for controlling the one peripheral device by issuing control communications to the one peripheral device, and any one of a plurality of different arrangements each for interfacing the driver to any one of the peripheral devices by conveying the control communications between the driver and the one device either through a different operating environment or through the same operating environment in a different manner, comprising the steps of:

the driver issuing identical function calls in any one of a plurality of systems to any one of the plurality of arrangements for any one of the plurality of devices and obtaining in response identical services in any one of the systems from any one of the arrangements irrespective of the manner or the operating environment in which the one arrangement provides the services, thereby making the driver portable between the systems of the plurality of systems, the steps of issuing and obtaining including the steps of in response to receipt from a requester of a request for a peripheral device job, the driver using a first system-independent, interfacing arrangement-independent, and device-independent call to the interfacing arrangement;

in response to receipt of the first call, the interfacing arrangement allocating a data structure to the driver for the job;

in response to receipt of the first call, the interfacing arrangement allocating a data structure to the driver for the job;

in response to the allocation, the driver storing in the data structure first information defining the requested job including addressing information, and second information specifying a call to be made upon completion of execution of the requested job, the first and the second information and manner of storage thereof in the data structure being identical irrespective of either which one of the plurality of interfacing arrangements or which one of the plurality of operating environments is the included arrangement or defined environment;

the driver issuing a second system-independent, interfacing arrangement-independent, and device-independent call to the interfacing arrangement;

in response to receipt of the second call, the interfacing arrangement storing in the data structure information for translating the addressing information, the information for translating being dependent upon the defined operating environment;

the driver issuing a third system-independent, interfacing arrangement-independent, and device-independent call to the interfacing arrangement;

in response to receipt of the third call, the interfacing arrangement executing, in cooperation with a peripheral device, the job defined by the first information;

the interfacing arrangement storing in the data structure third information concerning execution of the job;

upon completion of execution of the job, the interfacing arrangement issuing to the driver the call specified by the second information;

following receipt of the call from the interfacing arrangement, the driver examining the third information to determine whether job execution was successful;

the driver providing to the requester notice of one of successful and unsuccessful job completion as response to the job request;

following receipt of the call from the interfacing arrangement, the driver issuing a fourth system-independent, interfacing arrangement-independent, and device-independent call to the interfacing arrangement; and in response to receipt of the fourth call, the interfacing arrangement deallocating the data structure from the driver and the job.

7. The method of claim 6 wherein the step of executing the job comprises the steps of in response to receipt of the third call, enqueuing the job with other unexecuted jobs and executing, in cooperation with the device, enqueued jobs in an order in which they are enqueued; and wherein the step of examining the third information is followed by the steps of in response to determining that job execution was unsuccessful, the driver issuing a fifth call to the interfacing arrangement, and in response to receipt of the fifth call, the interfacing arrangement re-executing, in cooperation with the device, the unsuccessfully-executed job defined by the first information, before executing any enqueued jobs.

8. The method of claim 6 wherein the step of executing the job comprises the steps of in response to receipt of the third call, enqueuing the job with other unexecuted jobs, and executing, in cooperation with the device, enqueued jobs in an order in which they are enqueued; and wherein the step of examining the third information is followed by the steps of in response to determining that job execution was unsuccessful, the driver storing in a second data structure fourth information defining a second job, the driver issuing a fifth call to the interfacing arrangement, and in response to receipt of the fifth call, the interfacing arrangement executing the job defined by the fourth information, before executing any enqueued jobs.

9. A method of performing a peripheral device job in cooperation with a device driver, in a system defining any one of a plurality of different operating environments, the system including any one of a plurality of peripheral devices controllable by control communications issued to the one device by the device driver and any one of a plurality of different arrangements each for interfacing the driver to any one of the peripheral devices by conveying the control communications between the driver and the one device either through a different operating environment or through the same operating environment in a different manner, the method comprising the steps of:

any one of the interfacing arrangements providing to the driver identical services in any one of a plurality of systems irrespective of the operating environment in which the one arrangement provides the services, in response to the driver issuing function calls that are identical in any one of the plurality of systems to any one of the plurality of arrangements for any one of the devices, thereby making the driver portable between the systems of the plurality of systems, the step of providing including the steps of in response to receipt of a first system-independent, interfacing arrangement-independent, and device-independent call from the driver, the interfacing arrangement allocating a data structure to the driver;

in response to receipt of a second system-independent, interfacing arrangement-independent, and device-independent call from the driver, the interfacing arrangement executing, cooperatively with the device, a peripheral device job defined by information stored in the data structure by the driver, the information stored by the driver and manner of storage thereof in the data structure being identical irrespective of either which one of the plurality of interfacing arrangements or which one of the plurality of operating environments is the included arrangement or defined environment;

upon completion of execution of the job, the interfacing arrangement issuing to the driver a call specified by information stored in the data structure by the driver; and in response to receipt of a third system-independent, interfacing arrangement-independent, and device-independent call from the driver, the interfacing arrangement deallocating the data structure from the driver.

10. The method of claim 9 wherein the step of executing a job is preceded by the step of in response to receipt of a fourth call from the driver, the interfacing arrangement storing in the data structure information for translating addressing information defining the job and stored in the data structure by the driver.

11. The method of claim 9 wherein the step of issuing to the driver the specified call is preceded by the step of storing in the data structure information concerning execution of the job, for use by the driver.

12. The method of claim 9 wherein the step of executing a job comprises the steps of in response to receipt of a second call from the driver, the interfacing arrangement enqueuing the job defined by information stored in the data structure by the driver, with other unexecuted jobs, and the interfacing arrangement executing, cooperatively with the device, enqueued jobs in an order in which they are enqueued; the method further comprising the step of in response to receipt of a fourth call from the driver, the interfacing arrangement executing an unenqueued job defined by information stored in a data structure by the driver, before executing any enqueued jobs.

13. A method of performing a peripheral device job in cooperation with a device driver, in a system defining any one of a plurality of different operating environments, the system including any one of a plurality of peripheral devices controllable by control communications issued to the one device by the driver and any one of a plurality of different arrangements each for interfacing the driver to any one of the peripheral devices by conveying the control communications between the driver and the one device either through a different operating environment or through the same operating environment in a different manner, the method comprising the steps of:

any one of the interfacing arrangement providing to the driver identical services in any one of a plurality of systems irrespective of the operating environment in which the one arrangement provides the services, in response to the driver issuing function calls that are identical in any one of the plurality of systems to any one of the plurality of arrangements for any one of the devices, thereby making the driver portable between the systems of the plurality of systems, the step of providing including the steps of in response to receipt of a first system-independent, interfacing arrangement-independent, and device-independent call from the driver, the interfacing arrangement allocating a data structure to the driver for a peripheral device job;

in response to receipt of a second system-independent, interfacing arrangement-independent, and device-independent call from the driver, the interfacing arrangement storing in the allocated data structure information for translating addressing information defining the job and stored in the data structure by the driver, the information for translating being dependent upon the defined operating environment, the information stored by the driver and manner of storage thereof in the data structure being identical irrespective of either which one of the plurality of interfacing arrangements or which one of the plurality of operating environments is the included arrangement or defined environment;

in response to receipt of a third system-independent, interfacing arrangement-independent, and device-independent call from the driver, the interfacing arrangement executing, cooperatively with a device, the job defined by information including the addressing information stored in the data structure by the driver;

the interfacing arrangement storing in the data structure information concerning execution of the job, for use by the driver in determining whether execution of the job was successful;

upon completion of execution of the job, the interfacing arrangement issuing to the driver a call specified by information stored in the data structure by the driver; and in response to receipt of a fourth system-independent, interfacing arrangement-independent, and device-independent call from the driver, the interfacing arrangement deallocating the data structure from the job and the driver.

14. The method of claim 13 wherein
the step of executing the job comprises the steps of
in response to receipt of the third call, enqueuing the job with other unexecuted jobs and
executing, in cooperation with the peripheral device, enqueued jobs in an order in which they are enqueued;
the method further comprising the step of
in response to receipt of a fifth call from the driver, the interfacing arrangement re-executing, in cooperation with the device, the job defined by the information stored in the data structure by the driver, before executing any enqueued jobs.

15. The method of claim 13 wherein
the step of executing the job comprises the steps of
in response to receipt of the third call, enqueuing the job with other unexecuted jobs and
executing, in cooperation with the peripheral device, enqueued jobs in an order in which they are enqueued;
the method further comprising the step of
in response to receipt of a fifth call from the driver, the interfacing arrangement executing an unenqueued job defined by information stored in a second data structure by the driver, before executing any enqueued jobs.

16. A method, for a device driver, of performing a peripheral device job in cooperation with a system defining any one of a plurality of different operating environments, the system including any one of a plurality of peripheral devices controllable by control communications issued to the one device by the device driver and any one of a plurality of different arrangements each for interfacing the driver to any one of the peripheral devices by conveying the control communications between the driver and the one device either through a different operating environment or through the same operating environment in a different manner, the method comprising the steps of:

the driver issuing identical function calls in any one of a plurality of systems to any one of the plurality of arrangements for any one of the plurality of devices to obtain in response identical services in any one of the systems from any one of the arrangements irrespective of the operating environment in which the one arrangement provides the services, thereby making the driver portable between the systems of the plurality of systems, the step of issuing including the steps of the driver issuing a first system-independent, interfacing arrangement-independent, and device-independent call to the interfacing arrangement for allocation of a data structure for a peripheral device job;

in response to allocation of a data structured, the driver storing in the data structure first information defining the job and second information specifying a call to be made upon completion of execution of the job, the information stored by the driver and manner of storage thereof in the data structure being identical irrespective of either which one of the plurality of interfacing arrangements or which one of the plurality of operating environments is the included arrangement or defined environment;

the driver issuing a second system-independent, interfacing arrangement-independent, and device-independent call to the interfacing arrangement for execution, in cooperation with the peripheral device, of the job defined by the first information; and following receipt from the interfacing arrangement of the call specified by the second information, the driver issuing a third system-independent, interfacing arrangement-independent, and device-independent call to the interfacing arrangement for deallocation from the job of the data structure.

17. The method of claim 16 wherein
the step of storing in the data structure first and second information comprises the step of
the driver storing in the data structure the first information including addressing information, and the second information; and wherein the step of issuing a call for execution is preceded by the step of the driver issuing a call to the interfacing arrangement for storing in the data structure information for translating the addressing information.

18. The method of claim 16 wherein the step of issuing a call for execution comprises the step of the driver issuing a first call to the interfacing arrangement for enqueuing the job with other unexecuted jobs for execution in an order in which the jobs are enqueued; and wherein the step of issuing a call for execution is followed by the further steps of following receipt from the interfacing arrangement of the call specified by the second information, the driver examining information concerning execution of the job stored in the data structure by the interfacing arrangement, to determine whether job execution was successful, and in response to determining that job execution was unsuccessful, the driver issuing a second call to the interfacing arrangement for execution of an unenqueued job defined by information stored in a data structure by the driver, before execution of any enqueued jobs.

19. The method of claim 18 wherein the step of issuing a second call comprises the step of the driver issuing a second call to the interfacing arrangement for re-execution, in cooperation with the peripheral device, of the unsuccessfully-executed job defined by the first information, before execution of any enqueued jobs.

20. The method of claim 18 wherein the step of issuing a second call is preceded by the step of in response to determining that job completion was unsuccessful, the driver storing in a second data structure fourth information defining a second job; and wherein the step of issuing a second call comprises the step of the driver issuing a second call to the interfacing arrangement for execution of the job defined by the fourth information, before execution of any enqueued jobs.

21. A method, for a device driver, of performing a peripheral device job in cooperation with a system defining any one of a plurality of different operating environments, the system including any one of a plurality of peripheral devices controllable by control communications issued to the one device by the device driver and any one of a plurality of different arrangements each for interfacing the driver to any one of the peripheral devices by conveying the control communications between the driver and the one device either through a different operating environment or through the same operating environment in a different manner, the method comprising the steps of:

the driver issuing identical function calls in any one of a plurality of systems to any one of the plurality of arrangements for any one of the plurality of devices to obtain in response identical services in any one of the systems from any one of the arrangements irrespective of the operating environment in which the one arrangement provides the services, thereby making the driver portable between the systems of the plurality of systems, the step of issuing including the steps of in response to receipt from a requester of a request for a peripheral device job, the driver issuing a first system-independent, interfacing arrangement-independent, and device-independent call to the interfacing arrangement for allocation of a data structure to the driver for the job;

in response to allocation of a data structure, the driver storing in the data structure first information defining the job including addressing information, and second information specifying a call to be made upon completion of execution of the job, the first and the second information and manner of storage thereof in the data structure being identical irrespective of either which one of the plurality of interfacing arrangements or which one of the plurality of operating environments is the included arrangement or defined environment;

the driver issuing a second system-independent, interfacing arrangement-independent, and device-independent call to the interfacing arrangement for storing in the data structure information for translating the addressing information, the information for translating being dependent upon the defined operating environment;

the driver issuing a third system-independent, interfacing arrangement-independent, and device-independent call to the interfacing arrangement for execution, in cooperation with a peripheral device, of the job defined by the first information;

following receipt from the interfacing arrangement of the call specified by the second information, the driver examining information concerning execution of the job stored in the data structure by the interfacing arrangement, to determine whether job execution was successful;

the driver providing to the requester notice of one of successful and unsuccessful job completion as response to the job request; and following receipt from the interfacing arrangement of the call specified by the second information, the driver issued a fourth system-independent, interfacing arrangement-independent, and device-independent call to the interfacing arrangement for deallocation of the data structure from the driver and the job.

22. The method of claim 21 wherein the step of issuing a call for execution of the job comprises the step of the driver issuing a call to the interfacing arrangement for enqueuing the job with other unexecuted jobs for execution in an order in which the jobs are enqueued; and wherein the step of examining the information concerning execution of the job is followed by the step of in response to determining that job execution was unsuccessful, the driver issuing a call to the interfacing arrangement for re-execution, in cooperation with the device, of the unsuccessfully-executed job defined by the first information before executing any enqueued jobs.

23. The method of claim 21 wherein the step of issuing a call for execution of the job comprises the step of the driver issuing a call to the interfacing arrangement for enqueuing the job with other unexecuted jobs for execution in an order in which the jobs are enqueued; and wherein the step of examining the information concerning execution of the job is followed by the steps of in response to determining that job execution was unsuccessful, the driver storing in a second data structure fourth information defining a second job, and the driver issuing a call to the interfacing arrangement for execution of the job defined by the fourth information, before execution of any enqueued jobs.

24. An apparatus for performing a peripheral device job in any one of a plurality of different operating environments, the apparatus including any one of a plurality of peripheral devices, a driver for controlling the one peripheral device by issuing control communications to the one peripheral device, and any one of a plurality of different arrangements each for interfacing the driver to any one of the peripheral devices by conveying the control communications between the driver and the one device either through a different operating environment or through the same operating environment in a different manner, characterized in that:

the driver issues identical function calls in any one of a plurality of systems to any one of the plurality of arrangements for any one of the plurality of devices to obtain in response identical services in any one of the systems from any one of the arrangements irrespective of the manner or the operating environment in which the one arrangement provides the services, thereby being portable between the systems of the plurality of systems, and means for issuing a first-system-independent, interfacing arrangement-independent, and device-independent call to the interfacing arrangement for data structure allocation;

means, responsive to allocation of a data structure, for storing in the data structure first information defining the peripheral device job, and second information specifying a call to be made upon completion of execution of the job, the first and the second information and manner of storage thereof in the data structure being identical irrespective of either which one of the plurality of interfacing arrangements or which one of the plurality of operating environments is the included arrangement or defined environment;

means for issuing a second system-independent, interfacing arrangement-independent, and device-independent call to the interfacing arrangement for job execution, and means, responsive to receipt from the interfacing arrangement of the call specified by the second information, for issuing a third system-independent, interfacing arrangement-independent, and device-independent call to the interfacing arrangement for data structure deallocation; and any one of the interfacing arrangements provides to the driver identical services in any one of the systems in response to the function calls issued by the driver irrespective of the operating environment in which the one arrangement provides the services, and the one interfacing arrangement comprises means, responsive to the first call, for allocating a data structure to the driver for the job, means, responsive to the second call, for executing, cooperatively with the device, the peripheral device job defined by the first information, means for issuing to the driver the call specified by the second information, upon completion of execution of the job, and means, responsive to the third call, for deallocating the data structure from the driver and the job.

25. The apparatus of claim 24 wherein the means for storing information in the data structure comprise means for storing in the data structure the first information including addressing information; wherein the driver further comprises means for issuing a fourth call to the interfacing arrangement, prior to the second call; and wherein the interfacing arrangement further comprises means, responsive to receipt of the fourth call, for storing in the data structure information for translating the addressing information.

26. The apparatus of claim 24 wherein the means for executing the job comprise means, responsive to receipt of the second call, for enqueuing a job defined by information stored in the data structure with other unexecuted jobs, and means for executing, cooperatively with the device, enqueued jobs in an order in which they are enqueued; wherein the interfacing arrangement further comprises means for storing in the data structure information concerning execution of the job, and means, responsive to receipt of a fourth call from the driver, for executing an unenqueued job defined by information stored in a data structure by the driver, before execution of any enqueued jobs; and wherein the driver further comprises means, responsive to receipt from the interfacing arrangement of the call specified by the second information, for examining the information concerning execution of the job to determine success of the execution, and means, responsive to determination by the determining means that job execution was unsuccessful, for issuing the fourth call to the interfacing arrangement.

27. An apparatus for performing a peripheral device job in any one of a plurality of different operating environments, the apparatus including any one of a plurality of peripheral devices, a driver for controlling the one peripheral device by issuing control communications to the one peripheral device, and any one of a plurality of different arrangements each for interfacing the driver to any one of the peripheral devices by conveying the control communications between the driver and the one device either through a different operating environment or through the same operating environment in a different manner, characterized in that:

the driver issues identical function calls in any one of a plurality of systems to any one of the plurality of arrangements for any one of the plurality of devices to obtain in response identical services in any one of the systems from any one of the arrangements irrespective of the manner or the operating environment in which the one arrangement provides the services, thereby being portable between the systems of the plurality of systems, and comprises means, responsive to receipt from a requester of a request for a peripheral device job, for issuing a first system-independent, interfacing arrangement-independent, and device-independent call to the interfacing arrangement for data structure allocation for the job, means, responsive to allocation of a data structure for the job, for storing in the data structure first information defining the peripheral job and including addressing information, and second information specifying a call to be made upon completion of execution of the job, the first and the second information and manner of storage thereof in the data structure being identical irrespective of either which one of the plurality of interfacing arrangements or which one of the plurality of operating environments is the included arrangement or defined environment, means for issuing a second system-independent, interfacing arrangement-independent, and device-independent call to the interfacing arrangement for providing address translation information, means for issuing a third system-independent, interfacing arrangement-independent, and device-independent call to the interfacing arrangement for job execution, means, responsive to receipt from the interfacing arrangement of the call specified by the second information, for examining information concerning execution of the job and stored in the data structure by the interfacing means, to determine success of the execution, means, cooperative with the examining means, for providing notice of one of successful and unsuccessful job completion to the requester in response to the job request, and means, responsive to receipt from the interfacing arrangement of the call specified by the second information, for issuing a fourth system-independent, interfacing arrangement-independent, and device-independent call to the interfacing arrangement for data structure deallocation; and any one of the interfacing arrangements provides to the driver identical services in any one of the systems in response to the function calls issued by the driver irrespective of the operating environment in which the one arrangement provides the services, and the one interfacing arrangement comprises means, responsive to the first call, for allocating a data structure to the driver for the job, means, responsive to the second call, for storing in the data structure information for translating the addressing information, the information for translating being dependent upon the defined operating environment;

means, responsive to the third call, for executing, cooperatively with a device, the job defined by the first information, means for storing in the data structure information concerning execution of the job, means for issuing to the driver the call specified by the second information, upon completion of execution of the job, and means, responsive to the fourth call, for deallocating the data structure from the driver and the job.

28. The apparatus of claim 27 wherein the means for executing the job comprise means, responsive to receipt of the third call, for enqueuing a job, defined by information stored in the data structure, with other unexecuted jobs, and means for executing, cooperatively with a device, enqueued jobs in an order in which they are enqueued; wherein the driver further comprises means, responsive to determination by the determining means that job execution was unsuccessful, for issuing a fifth call to the interfacing arrangement; and wherein the interfacing arrangement further comprises means, responsive to receipt of the fifth call, for executing an unenqueued job, defined by information stored in a data structure by the driver, before execution of any enqueued jobs.

29. A device driver for controlling a device in an apparatus for performing a peripheral device job, the apparatus defining any one of a plurality of different operating environments and including any one of a plurality of peripheral devices controllable by control communications issued to the one device by the driver and any one of a plurality of different arrangements each for interfacing the driver to any one of the peripheral devices by conveying the control communications between the driver and the one device either through a different operating environment or through the same operating environment in a different manner, characterized in that:

the driver issues identical function calls in any one of a plurality of systems to any one of the plurality of arrangements for any one of the plurality of devices to obtain in response identical services in any one of the systems from any one of the arrangements irrespective of the manner or the operating environment in which the one arrangement provides the services, thereby being portable between the systems of the plurality of systems, and comprises means for issuing a first system-independent, interfacing arrangement-independent, and device-independent call to the interfacing arrangement for allocation of a data structure for a peripheral device job;

means, responsive to allocation of a data structure for the job, for storing in the data structure first information defining the peripheral device job and second information specifying a call to be made upon completion of execution of the job, the first and the second information and manner of storage thereof in the data structure being identical irrespective of either which one of the plurality of interfacing arrangements or which one of the plurality of operating environments is the included arrangement or defined environment;

means for issuing a second system-independent, interfacing arrangement-independent, and device-independent call to the interfacing arrangement for execution, in cooperation with the peripheral device, of the job defined by the first information; and means, responsive to receipt from the interfacing arrangement of the call specified by the second information, for issuing a third system-independent, interfacing arrangement-independent, and device-independent call to the interfacing arrangement for deallocation from the driver of the job's data structure.

30. The driver of claim 29 wherein the means for storing information in the data structure comprise means for storing the first information including addressing information; and wherein the driver further comprises, means for issuing a fourth call to the interfacing arrangement prior to the second call, for storing in the data structure information for translating the addressing information.

31. The driver of claim 29 wherein the means for issuing a second call comprise means for issuing a call to the interfacing arrangement for enqueuing a peripheral device job defined by the first information with other unexecuted jobs for execution in an order in which the jobs are enqueued; and wherein the driver further comprises means, responsive to receipt from the interfacing arrangement of the call specified by the second information, for examining third information concerning execution of the job and stored in the data structure by the interfacing arrangement, to determine success of the execution, and means, responsive to determination by the determining means that job execution was unsuccessful, for issuing a fourth call to the interfacing arrangement for execution of an unenqueued job defined by information stored in a data structure by the driver, before execution of any enqueued jobs.

32. A device driver for controlling a device in an apparatus for performing a peripheral device job, the apparatus defining any one of a plurality of different operating environments and including any one of a plurality of peripheral devices controllable by control communications issued to the one device by the driver and any one of a plurality of different arrangements each for interfacing the driver to any one of the devices by conveying the control communications between the driver and the one device either through a different operating environment or through the same operating environment in a different manner, characterized in that:

the driver issues identical function calls in any one of a plurality of systems to any one of the plurality of arrangements for any one of the plurality of devices to obtain in response identical services in any one of the systems from any one of the arrangements irrespective of the manner or the operating environment in which the one arrangement provides the services, thereby being portable between the systems of the plurality of systems, and comprises means, responsive to receipt from a requester of a request for a peripheral device job, for issuing a first system-independent, interfacing arrangement-independent, and device-independent call to the interfacing arrangement for data structure allocation for the job;

means, responsive to allocation of a data structure for the job, for storing in the data structure first information defining the peripheral job and including addressing information, and second information specifying a call to be made upon completion of execution of the job, the first and the second information and manner of storage thereof in the data structure being identical irrespective of either which one of the plurality of interfacing arrangements or which one of the plurality of operating environments is the included arrangement or defined environment;

means for issuing a second system-independent, interfacing arrangement-independent, and device-independent call to the interfacing arrangement for storing in the data structure information for translating the addressing information, the information for translating being dependent upon the defined operating environment;

means for issuing a third system-independent, interfacing arrangement-independent, and device-independent call to the interfacing arrangement for execution, in cooperation with a peripheral device, of the job defined by the first information;

means, responsive to receipt from the interfacing arrangement of the call specified by the second information, for examining information concerning execution of the job and stored in the data structure by the interfacing means, to determine success of the execution;

means, cooperative with the examining means, for providing notice of one of successful and unsuccessful job completion to the requester in response to the job request; and means, responsive to receipt from the interfacing arrangement of the call specified by the second information, for issuing a fourth system-independent, interfacing arrangement-independent, and device-independent call to the interfacing arrangement for deallocation from the driver and the job of the job's data structure.

33. The apparatus of claim 32 wherein the means for issuing a third call comprise means for issuing a call to the interfacing arrangement for enqueuing a peripheral device job defined by the first information with other unexecuted jobs for execution in an order in which the jobs are enqueued; and wherein the driver further comprises means, responsive to determination by the determining means that job execution was unsuccessful, for issuing a fifth call to the interfacing arrangement for execution of an unenqueued job defined by information stored in a data structure by the driver, before execution of any enqueued jobs.

34. The apparatus of claim 33 wherein the means for issuing the fifth call comprise means for issuing a fifth call to the interfacing arrangement for re-execution, cooperatively with the device, of the unsuccessfully-executed job defined by the first information, before execution of any enqueued jobs.

35. The apparatus of claim 33 wherein the driver further comprises means, responsive to determination by the determining means that job execution was unsuccessful, for storing in a second data structure information defining a second job; and wherein the means for issuing the fifth call comprise means for issuing a fifth call to the interfacing arrangement for execution of the job defined by the information stored in the second data structure, before execution of any enqueued jobs.

36. An arrangement for interfacing a device driver to a peripheral device in a system for performing a peripheral device job and defining any one of a plurality of different operating environments, the system including any one of a plurality of peripheral devices, the device driver for controlling the one peripheral device by issuing control communications to the one peripheral device, and the interfacing arrangement being any one of a plurality of different interfacing arrangements each for interfacing the driver to any one of the peripheral devices, by conveying the control communications between the driver and the one device either through a different operating environment or through the same operating environment in a different manner, the one interfacing arrangement characterized in that:

any one of the interfacing arrangements provides to the driver identical services in any of a plurality of systems irrespective of the operating environment in which the one arrangement provides the services, in response to the driver issuing function calls that are identical in any one of the plurality of systems to any one of the plurality of arrangements for any one of the devices, thereby making the driver portable between the systems of the plurality of systems, the one interfacing arrangement comprising means, responsive to receipt of a first system-independent, interfacing arrangement-independent, and device-independent call from the device driver, for allocating a data structure to the driver;

means, responsive to receipt of a second system-independent, interfacing arrangement-independent, and device-independent call from the device driver, for executing, cooperatively with a device, a peripheral device job defined by information stored in the data structure by the driver, the information stored by the driver and manner of storage thereof in the data structure being identical irrespective of either which one of the plurality of interfacing arrangements or which one of the plurality of operating environments is the included arrangement or defined environment;

means for issuing to the driver a call specified by information stored in the data structure by the driver, upon completion of execution of the job; and means, responsive to receipt of a third system-independent, interfacing arrangement-independent, and device-independent call from the driver, for deallocating the data structure from the driver.

37. The arrangement of claim 36 further comprising means, responsive to receipt of a fourth call from the driver, for storing in the data structure information for translating addressing information defining the job and stored in the data structure by the driver.

38. The arrangement of claim 36 wherein the means for executing the job comprise means, responsive to receipt of the second call, for enqueuing the job defined by information stored in the data structure, with other unexecuted jobs, and means for executing, cooperatively with the device, enqueued jobs in an order in which they are enqueued; the arrangement further comprising means for storing in the data structure information concerning execution of the job, for use by the driver, and means, responsive to receipt of a fourth call from the driver, for executing an unenqueued job defined by information stored in a data structure by the driver, before executing any enqueued jobs.

39. An arrangement for interfacing a device driver to a peripheral device in a system for performing a peripheral device job and defining any one of a plurality of different operating environments, the system including any one of a plurality of a plurality of peripheral devices, the device driver for controlling the one peripheral device by issuing control communications to the one peripheral device, and the interfacing arrangement being any one of a plurality of different interfacing arrangements each for interfacing the driver to any one of the peripheral devices by conveying the control communications between the driver and the one device either through a different operating environment or through the same operating environment in a different manner, the one interfacing arrangement characterized in that:

any one of the interfacing arrangements provides to the driver identical services in any of a plurality of systems irrespective of the operating environment in which the one arrangement provides the services, in response to the driver issuing function calls that are identical in anyone of the plurality of systems to any one of the plurality of arrangements for any one of the devices, thereby making the driver portable between the systems of the plurality of systems, the one interfacing arrangement comprising means, responsive to receipt of a first system-independent, interfacing arrangement-independent, and device-independent call from the driver, for allocating a data structure to the driver for a peripheral device job;

means, responsive to receipt of a second system-independent, interfacing arrangement-independent, and device-independent call from the driverfor storing in the allocated data structure information for translating addressing information defining the job and stored in the data structure by the driver, the information for translating being dependent upon the defined operating environment, the information stored by the driver and manner of storage thereof in the data structure being identical irrespective of either which one of the plurality of interfacing arrangements or which one of the plurality of operating environments is the included arrangement or defined environment;

means, responsive to receipt of a third system-independent, interfacing arrangement-independent, and device-independent call from the driver, for executing, cooperatively with a device, the job defined by information stored in the data structure by the driver;

means for storing in the data structure information concerning execution of the job, for use by the driver;

means for issuing to the driver a call specified by information stored in the data structure by the driver, upon completion of execution of the job; and means, responsive to receipt of a fourth system-independent, interfacing arrangement-independent, and device-independent call from the driver, for deallocating the data structure from the driver and the job.

40. The arrangement of claim 39 wherein the means for executing the job comprise means, responsive to receipt of the third call, for enqueuing the job defined by information stored in the data structure, with other unexecuted jobs, and means for executing, cooperatively with the device, enqueued jobs in an order in which they are enqueued; the arrangement further comprising means, responsive to receipt of a fifth call from the driver, for executing an unenqueued job defined by information stored in a data structure by the driver, before executing any enqueued jobs.

41. A method of performing a peripheral device job in a system defining any one of a plurality of different operating environments, the system including any one of a plurality of peripheral devices, a driver for controlling the one peripheral device by issuing control communications to the one peripheral device, and any one of a plurality of different arrangements each for interfacing the driver to any one of the peripheral devices by conveying the control communications between the driver and the one device either through a different operating environment or through the same operating environment in a different manner, comprising the steps of:

the driver issuing identical function calls in any one of a plurality of systems to any one of the plurality of arrangements for any one of the plurality of devices and obtaining in response identical services in any one of the systems from any one of the arrangements irrespective of the manner or the operating environment in which the one arrangement provides the services, thereby making the driver portable between the systems of the plurality of systems, the steps of issuing and obtaining including the steps of the driver issuing a first system-independent, interfacing arrangement-independent, and the device-independent call to the interfacing arrangement;

in response to receipt of the first call, the interfacing arrangement allocating a data structure to the driver;

in response to the allocation, the driver storing in the data structure first information defining a peripheral device job and second information specifying a call to be made upon completion of execution of the job, the first and the second information and manner of storage thereof in the data structure being identical irrespective of either which one of the plurality of interfacing arrangements or which one of the plurality of operating environments is the included arrangement or defined environment;

the driver issuing a second system-independent, interfacing arrangement-independent, and device-independent call to the interfacing arrangement;

in response to receipt of the second call, the interfacing arrangement executing, in cooperating with the peripheral device, the job defined by the first information; and upon completion of execution of the job, the interfacing arrangement issuing to the driver the call specified by the second information.

42. A method of performing a peripheral device job in cooperation with a device-driver, in a system defining any one of a plurality of different operating environments, the system including any one of a plurality of peripheral devices controllable by control communications issued to the one device by the device driver and any one of a plurality of different arrangements each for interfacing the driver to any one of the peripheral devices by conveying the control communications between the driver and the one device either through a different operating environment or through the same operating environment in a different manner, the method comprising the steps of:

any one of the interfacing arrangements providing to the driver identical services in any one of a plurality of systems irrespective of the operating environment in which the one arrangement provides the services, in response to the driver issuing function calls that are identical in any one of the plurality of systems to any one of the plurality of arrangements for any one of the devices, thereby making the driver portable between the systems of the plurality of systems, the step of providing including the steps of in response to receipt of a first system-independent, interfacing arrangement-independent, and device-independent call from the driver, the interfacing arrangement allocating a data structure to the driver;

in response to receipt of a second system-independent, interfacing arrangement-independent, and device-independent call from the driver, the interfacing arrangement executing, cooperatively with the device, a peripheral device job defined by information stored in the data structure by the driver, the information stored by the driver and manner of storage thereof in the data structure being identical irrespective of either which one of the plurality of interfacing arrangements or which one of the plurality of operating environments is the included arrangement or defined environment; and upon completion of execution of the job, the interfacing arrangement issuing to the driver a call specified by information stored in the data structure by the driver.

43. A method, for a device driver, of performing a peripheral device job in cooperation with a system defining any one of a plurality of different operating environments, the system including any one of a plurality of peripheral devices controllable by control communications issued to the one device by the device driver and any one of a plurality of different arrangements each for interfacing the driver to any one of the peripheral devices by conveying the control communications between the driver and the one device either through a different operating environment or through the same operating environment in a different manner, the method comprising the steps of:

the driver issuing identical function calls in any one of a plurality of systems to any one of the plurality of arrangements for any one of the plurality of devices to obtain in response identical services in any one of the systems from any one of the arrangements irrespective of the operating environment in which the one arrangement provides the services, thereby making the driver portable between the systems of the plurality of systems, the step of issuing including the steps of the driver issuing a first system-independent, interfacing arrangement-independent, and device-independent call to the interfacing arrangement for allocation of a data structure for a peripheral device job;

in response to allocation of a data structure, the driver storing in the data structure first information defining the job and second information specifying a call to be made upon completion of execution of the job, the information stored by the driver and manner of storage thereof in the data structure being identical irrespective of either which one of the plurality of interfacing arrangements or which one of the plurality of operating environments is the included arrangement or defined environment;

the driver issuing a second system-independent, interfacing arrangement independent, and device-independent call to the interfacing arrangement for execution, in cooperation with the peripheral device, of the job defined by the first information; and following execution of the job, the driver receiving from the interfacing arrangement the call specified by the second information.

44. An apparatus for performing a peripheral device job in any one of a plurality of different operating environments, the apparatus including any one of a plurality of peripheral devices, a driver for controlling the one peripheral device by issuing control communications to the one peripheral device, and any one of a plurality of different arrangements each for interfacing the driver to any one of the peripheral devices by conveying the control communications between the driver and the one device either through a different operating environment or through the same operating environment in a different manner, characterized in that:

the driver issues identical function calls in any one of a plurality of systems to any one of the plurality of arrangements for any one of the plurality of devices to obtain in response identical services in any one of the systems from any one of the arrangements irrespective of the manner or the operating environment in which the one arrangement provides the services, thereby being portable between the systems of the plurality of systems, and comprises means for issuing a first system-independent, interfacing arrangement-independent, and device-independent call to the interfacing arrangement for data structure allocation, means, responsive to allocation of a data structure, for storing in the data structure first information defining the peripheral device job, and second information specifying a call to be upon completion of execution of the job, the first and the second information and manner of storage thereof in the data structure being identical irrespective of either which one of the plurality of interfacing arrangements or which one of the plurality of operating environments is the included arrangement or defined environment, and means for issuing a second system-independent, interfacing arrangement-independent, and device-independent call to the interfacing arrangement for job execution; and any one of the interfacing arrangements provides to the driver identical services in any one of the systems in response to the function calls issued by the driver irrespective of the operating environment in which the one arrangement provides the services, and the one interfacing arrangement comprises means, responsive to the first call, for allocating a data structure to the driver for the job, means, responsive to the second call, for executing, cooperatively with the device, the peripheral device job defined by the first information, and means for issuing to the driver the call specified by the second information, upon completion of execution of the job.

45. A device driver for controlling a device in an apparatus for performing a peripheral device job, the apparatus defining any one of a plurality of different operating environments and including any one of a plurality of peripheral devices controllable by control communications issued to the one device by the driver and any one of a plurality of different arrangements each for interfacing the driver to any one of the peripheral devices by conveying the control communications between the driver and the one device either through a different operating environment or through the same operating environment in a different manner, characterized in that:

the driver issues identical function calls in any one of a plurality of systems to any one of the plurality of arrangements for any one of the plurality of devices to obtain in response identical services in any one of the systems from any one of the arrangements irrespective of the manner or the operating environment in which the one arrangement provides the services, thereby being portable between the systems of the plurality of systems, and comprises means for issuing a first system-independent, interfacing arrangement-independent, and device-independent call to the interfacing arrangement for allocation of a data structure for a peripheral device job;

means, responsive to allocation of a data structure for the job, for storing in the data structure first information defining the peripheral device job and second information specifying a call to be made upon completion of execution of the job, the first and the second information and manner of storage thereof in the data structure being identical irrespective of either which one of the plurality of interfacing arrangements or which one of the plurality of operating environments i the included arrangement or defined environment; and means for issuing a second system-independent, interfacing arrangement-independent, and device-independent call to the interfacing arrangement for execution, in cooperation with the peripheral device, of the job defined by the first information.

46. An arrangement for interfacing a device driver to a peripheral device in a system for performing a peripheral device job and defining any one of a plurality of different operating environments, the system including any one of a plurality of peripheral devices, the device driver for controlling the one peripheral device by issuing control communications to the one peripheral device, and the interfacing arrangement being any one of a plurality of different interfacing arrangements each for interfacing the driver to any one of the peripheral devices by conveying the control communications between the driver and the one device either through a different operating environment or through the same operating environment in a different manner, the one interfacing arrangement characterized in that:

any one of the interfacing arrangements provides to the driver identical services in any of a plurality of systems irrespective of the operating environment in which the one arrangement provides the services, in response to the driver issuing function calls that are identical in any one of the plurality of systems to any one of the plurality of arrangements for any one of the devices, thereby making the driver portable between the systems of the plurality of systems, the one interfacing arrangement comprising means, responsive to receipt of a first system-independent, interfacing arrangement-independent, and device-independent call from the device driver, for allocating a data structure to the driver;

means, responsive to receipt of a second system-independent, interfacing arrangement-independent, and device-independent call from the device driver, for executing, cooperatively with a device, a peripheral device job defined by information stored in the data structure by the driver, the information stored by the driver and manner of storage thereof in the data structure being identical irrespective of either which one of the plurality of interfacing arrangements or which one of the plurality of operating environments is the included arrangement or defined environment; and means for issuing to the driver a call specified by information stored in the data structure by the driver, upon completion of execution of the job.

* * * * *

UNITED STATES PATENT AND TRADEMARK OFFICE
CERTIFICATE OF CORRECTION

PATENT NO.  : 4,975,829
DATED       : December 4, 1990
INVENTOR(S) : Thomas J. Clarey, et al It is certified that error appears in the above-identified patent and that said Letters Patent is hereby corrected as shown below:

The title page should be deleted and substitute therefor the attached title page showing the illustrative figure.

The sheets of drawings consisting of Figs. 1-15, should be added as shown on the attached pages.

Column 28, line 41, "issued" should read --issuing--.
Column 31, line 52, delete the semicolon and substitute a comma.
Column 39, line 40, after "be" insert --made--.

Signed and Sealed this

Twenty-third Day of June, 1992

Attest:

DOUGLAS B. COMER

Attesting Officer    Acting Commissioner of Patents and Trademarks

United States Patent [19]
Clarey et al.

[11] Patent Number: 4,975,829
[45] Date of Patent: Dec. 4, 1990

[54] COMMUNICATION INTERFACE PROTOCOL

[75] Inventors: Thomas J. Clarey, Elburn; Jeffrey L. Havens, Aurora, both of Ill.

[73] Assignee: AT&T Bell Laboratories, Murray Hill, N.J.

[21] Appl. No.: 909,687

[22] Filed: Sep. 22, 1986

[51] Int. Cl.⁵ .................................................. G06F 1/00
[52] U.S. Cl. ............................... 364/200; 364/284.2; 364/240.8; 364/274; 364/280; 364/282.2; 364/280.9; 364/284; 364/284.3
[58] Field of Search ... 364/200 MS File, 900 MS File, 364/300

[56] References Cited

U.S. PATENT DOCUMENTS

| | | | |
|---|---|---|---|
| 4,315,310 | 2/1982 | Bayliss et al. | 364/200 |
| 4,410,962 | 10/1983 | Daniels et al. | 1/900 |
| 4,449,182 | 5/1984 | Rubinson et al. | 364/200 |
| 4,475,156 | 10/1984 | Federico et al. | 364/200 |
| 4,542,457 | 9/1985 | Mortensen et al. | 364/200 |
| 4,587,628 | 5/1986 | Archer et al. | 364/900 |
| 4,589,063 | 5/1986 | Shah et al. | 364/200 |
| 4,649,479 | 3/1987 | Advani et al. | 364/300 |
| 4,701,848 | 10/1987 | Clyde | 364/900 |
| 4,736,321 | 4/1988 | Brown et al. | 364/300 |
| 4,747,040 | 5/1988 | Blanset et al. | 364/200 |
| 4,748,656 | 5/1988 | Gibbs et al. | 364/900 |
| 4,754,395 | 6/1988 | Weisshaar et al. | 364/200 |
| 4,768,150 | 8/1988 | Chang et al. | 364/300 |

OTHER PUBLICATIONS

Weiss, J., "Device Driver Interface for Decentral Device Drivers", Eurographics 79: proceedings, Bologna, Italy, 25-27, Oct. 79.

R. Snively, "Intelligent Host Adapter Directs I/O Traffic, Freeing the Host Processor", Electronic Design, vol. 32, No. 19 (09-20-84), pp. 243-246, 248, 250, 252.

J. B. Lohmeyer, "SCSI Host Adapter and Controller Command Structure", Mini-Micro Conf. Record, Northeast, N.Y., 5-84, paper 20/3, pp. 1-9.

Small Computer System Interface (SCLI), American National Standard draft proposal X3T9.2/82-2-Rev.17 B (Dec. 16, 1985), pp. 1-197.

NCR 5385 SCSI Protocol Controller Data Sheet, NCR Microelectronics Division (1983), pp. 1-50.

Viewgraphs, allegedly presented by NCR at Proceedings of SCSS 1 Forum, Merrimack, N.H., Sep. 1985, 11 sheets.

R. Barrett, "SCSI Bus Solves Peripheral Interface Problems," reprint from Mini-Micro Systems (May 1984), 4 pages.

Primary Examiner—Gareth D. Shaw
Assistant Examiner—Rebecca L. Rudolph
Attorney, Agent, or Firm—David Volejnicek

[57] ABSTRACT

In a computer system (FIG. 1), targets (13) comprising peripheral devices (18) and target controllers (17) are connected to the host system by means of a device bus (12), illustratively the standard Small Computer System Interface (SCSI) bus. The device bus is connected to the host computer's central control (9) by means of a host adapter (10) and bus (11). The host adapter is controlled from the central control by a host adapter driver (23), while the targets are controlled by target drivers (22). Host adapter driver 23 provides to target drivers a standardized interface (24) for communicating with the targets through the host adapter driver, which interface is optimized to support a simple yet flexible target driver design, and which makes target drivers independent of differences in structure and operation of host computers and hence portable between computers having the same device buses.

46 Claims, 10 Drawing Sheets